US011921920B2

(12) United States Patent
Grzesiak

(10) Patent No.: US 11,921,920 B2
(45) Date of Patent: Mar. 5, 2024

(54) METHOD FOR CONTROLLING DISPLAY DEVICE INCLUDING TRANSPARENT SCREEN, AND DISPLAY DEVICE THEREFOR

(71) Applicant: Samsung Electronics Co., Ltd., Suwon-si (KR)

(72) Inventor: Grzegorz Grzesiak, Warsaw (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/903,412

(22) Filed: Sep. 6, 2022

(65) Prior Publication Data

US 2022/0413608 A1    Dec. 29, 2022

Related U.S. Application Data

(63) Continuation of application No. PCT/KR2020/003247, filed on Mar. 9, 2020.

(30) Foreign Application Priority Data

Mar. 5, 2020 (KR) .......................... 10-2020-0027977

(51) Int. Cl.
*G06F 3/01* (2006.01)
*G06F 3/14* (2006.01)
(Continued)

(52) U.S. Cl.
CPC .............. *G06F 3/013* (2013.01); *G06F 3/012* (2013.01); *G06F 3/14* (2013.01); *G06F 18/24* (2023.01); *G02B 27/0101* (2013.01)

(58) Field of Classification Search
CPC . G02B 27/0093; G02B 27/0101; G06F 18/24; G06F 3/012; G06F 3/013;
(Continued)

(56) References Cited

U.S. PATENT DOCUMENTS 9,535,497 B2   1/2017   Rose et al.
9,898,971 B1   2/2018   Brush et al.
(Continued)

FOREIGN PATENT DOCUMENTS

KR    10-2011-0136012 A    12/2011
KR    10-2012-0029228 A     3/2012
(Continued)

OTHER PUBLICATIONS https://en.wikipedia.org/wiki/Angular_diameter.
Mercedes-Benz Singapore: The new C-Class Feature Films—Head-Up Display, https://www.youtube.com/watch?v=bR2HRL4naJA.

*Primary Examiner* — Kenneth Bukowski
(74) *Attorney, Agent, or Firm* — Jefferson IP Law, LLP

(57) ABSTRACT

A method of controlling a display device is provided. The method includes a transparent screen to recognize a position of a user in front of the transparent screen and an eye gaze of the user looking at the transparent screen, recognize a position of a background object behind the transparent screen, estimate, based on a distance between the transparent screen and the user, and a direction of the eye gaze of the user, a minimum angular change of the eye gaze by which the display device is able to detect a change in the eye gaze, and display, on the transparent screen, information related to the background object when the background object is at a position within the minimum angular change of the eye gaze from a current eye gaze of the user.

12 Claims, 19 Drawing Sheets

(51) Int. Cl.
*G06F 18/24* (2023.01)
*G02B 27/01* (2006.01)

(58) Field of Classification Search
CPC ....... G06F 3/14; G06F 3/147; G06Q 30/0259;
G06Q 30/0265; G06Q 30/0623; G06Q
30/0643; G06V 40/18; G09F 19/18; G09F
2340/0464; G09F 2370/022; G09F
2380/04; G09F 2380/06; G09F 2380/10;
G09F 3/001; G09F 5/38
See application file for complete search history.

(56) References Cited

U.S. PATENT DOCUMENTS

| | | | |
|---|---|---|---|
| 9,953,214 B2 | 4/2018 | Yin et al. | |
| 9,958,957 B2 | 5/2018 | Yun et al. | |
| 10,643,359 B2 | 5/2020 | Lee et al. | |
| 10,732,729 B2 | 8/2020 | Yun et al. | |
| 2011/0128223 A1 | 6/2011 | Lashina et al. | |
| 2012/0072873 A1 | 3/2012 | Park et al. | |
| 2012/0256854 A1 | 10/2012 | Lee et al. | |
| 2013/0260360 A1* | 10/2013 | Baurmann | G06F 3/14 |
| | | | 434/365 |
| 2014/0035942 A1 | 2/2014 | Yun et al. | |
| 2014/0204023 A1 | 7/2014 | Kumar et al. | |
| 2014/0300634 A1* | 10/2014 | Cho | G06T 19/006 |
| | | | 345/633 |
| 2016/0209647 A1* | 7/2016 | Fürsich | G02B 27/0075 |
| 2018/0217678 A1* | 8/2018 | Yun | G09G 3/3208 |

FOREIGN PATENT DOCUMENTS

| | | |
|---|---|---|
| KR | 10-1679265 B1 | 11/2016 |
| KR | 10-2017-0119807 A | 10/2017 |
| KR | 20170119807 A * | 10/2017 |
| KR | 10-1835363 B1 | 3/2018 |
| KR | 10-2018-0100292 A | 9/2018 |

* cited by examiner

FIG. 6
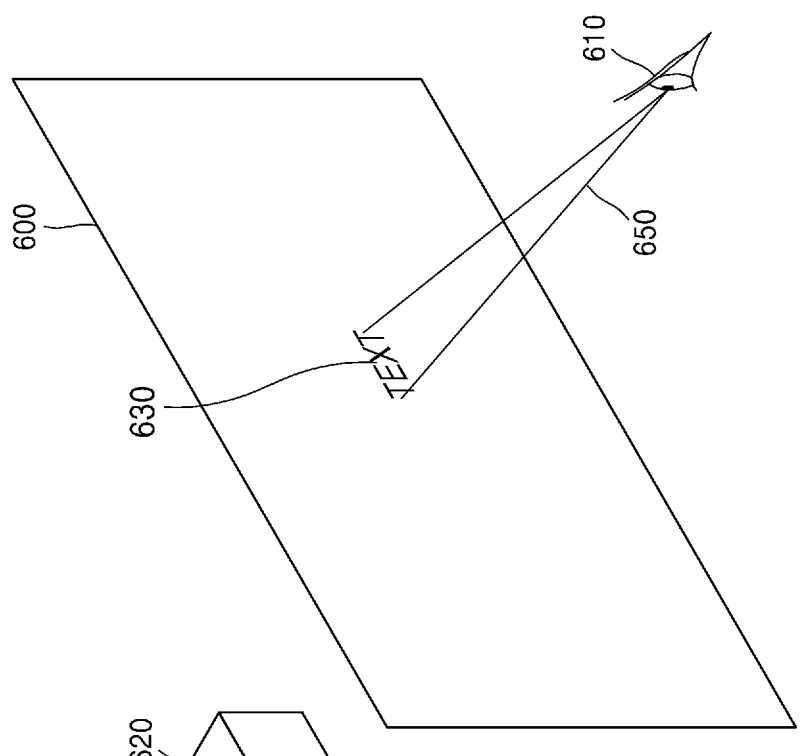
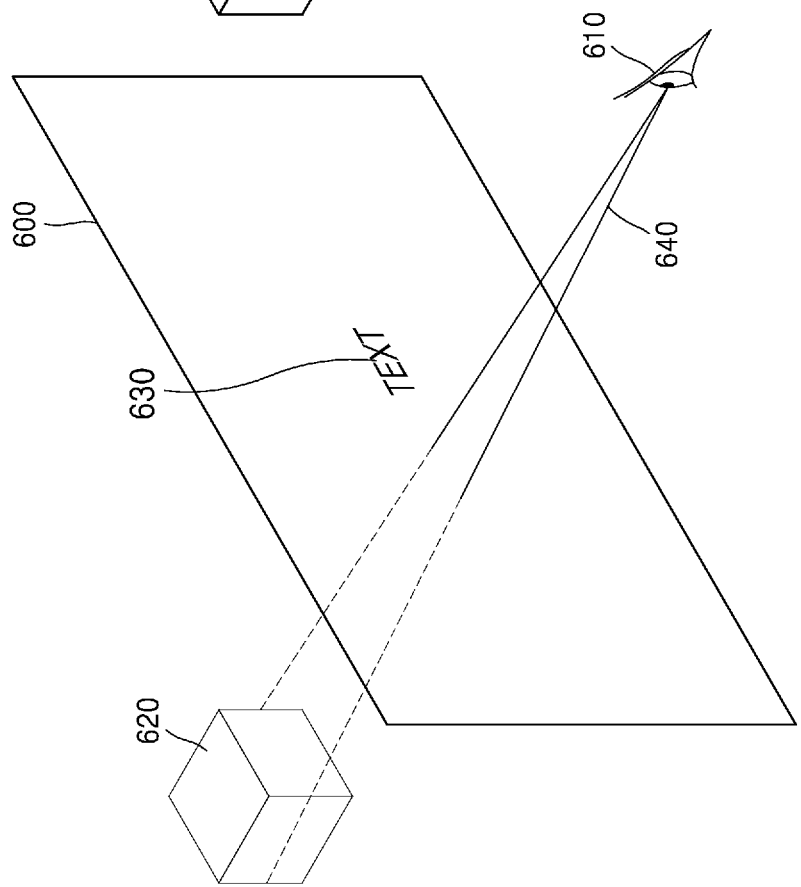

FIG. 16
TOP-DOWN VIEW
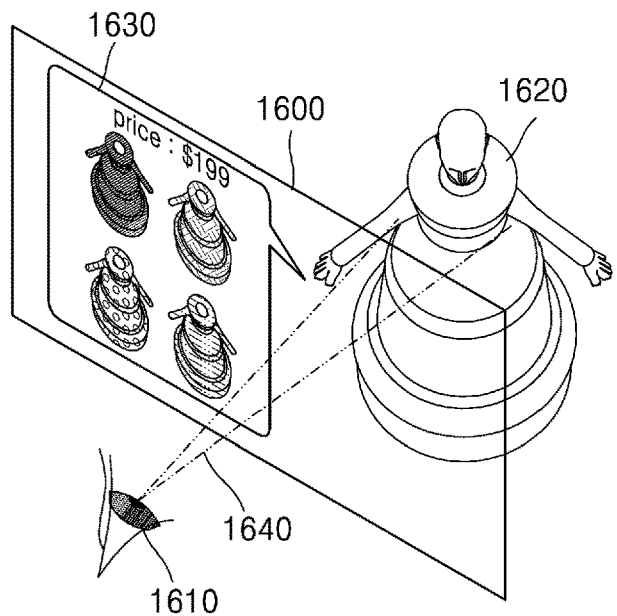
FRONT VIEW
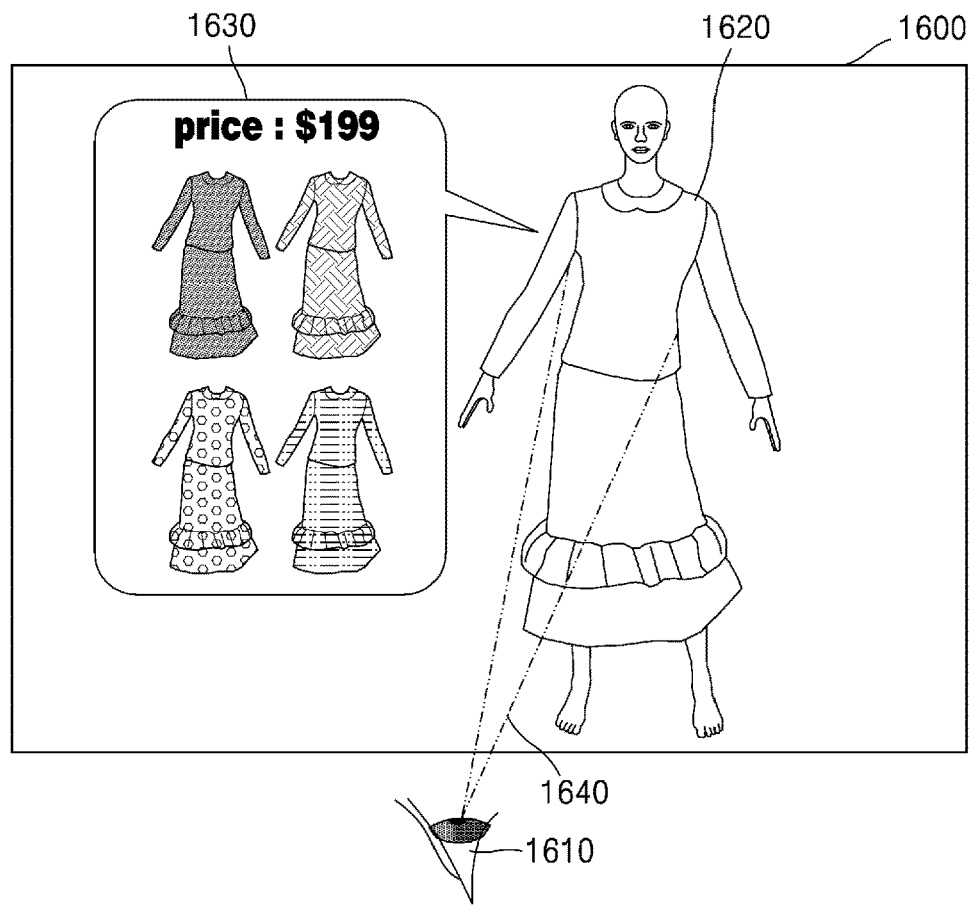

FIG. 17
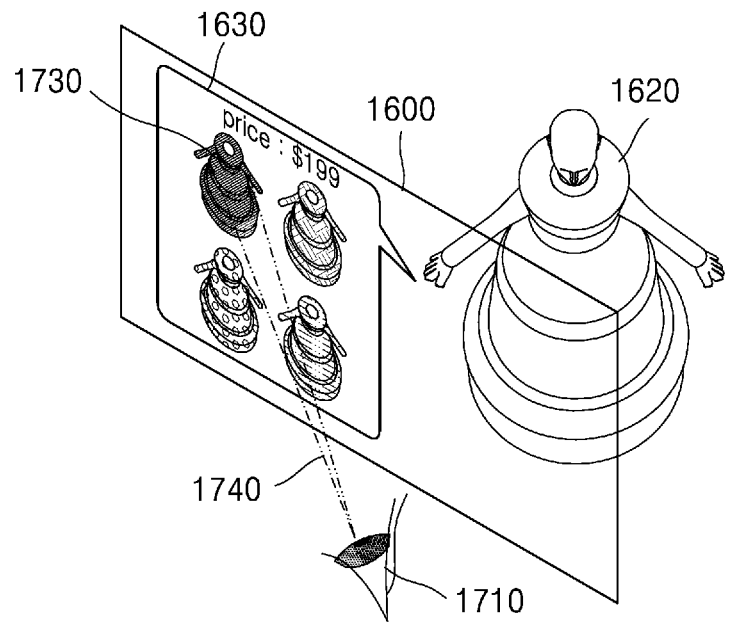
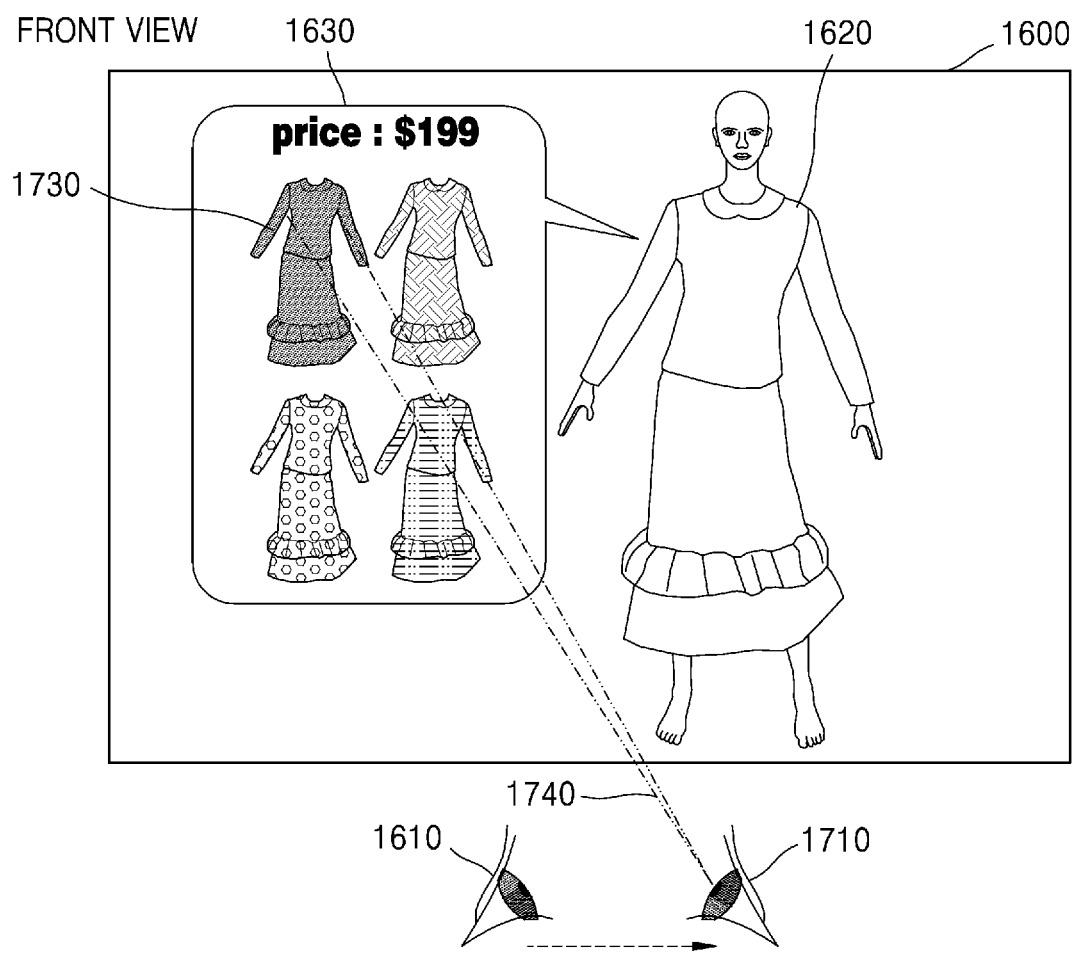

FIG. 18
TOP-DOWN VIEW
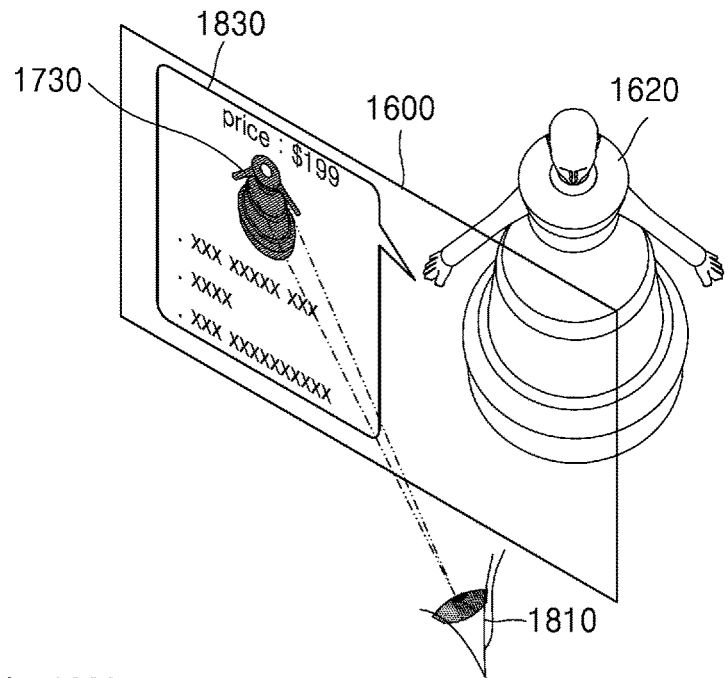
FRONT VIEW
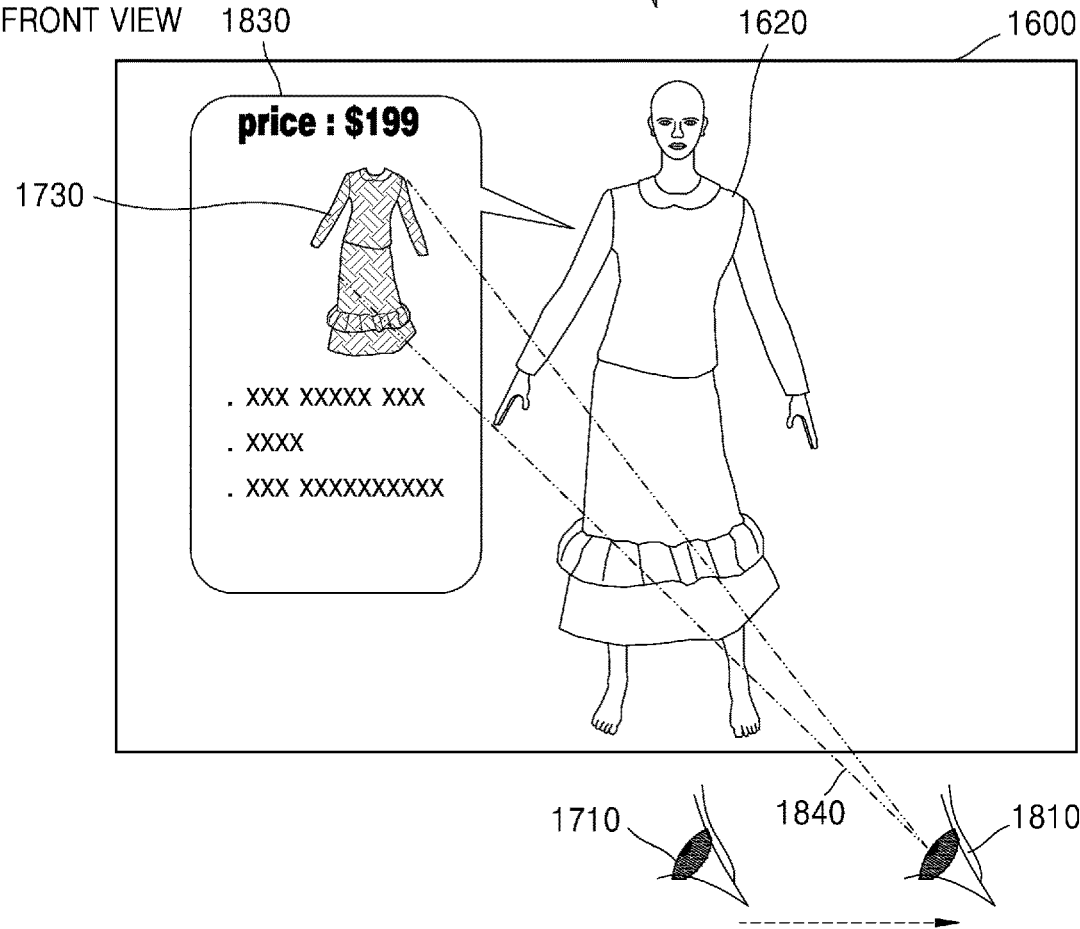

METHOD FOR CONTROLLING DISPLAY DEVICE INCLUDING TRANSPARENT SCREEN, AND DISPLAY DEVICE THEREFOR

CROSS-REFERENCE TO RELATED APPLICATION(S)

This application is a continuation application, claiming priority under § 365(c), of an International application No. PCT/KR2020/003247, filed on Mar. 9, 2020, which is based on and claims the benefit of a Korean patent application number 10-2020-0027977, filed on Mar. 5, 2020, in the Korean Intellectual Property Office, the disclosure of which is incorporated by reference herein in its entirety.

BACKGROUND

1. Field

The disclosure relates to the field of control of a display device including a transparent screen. More particularly, the disclosure relates to a method of controlling a display device to display digital information on a transparent screen, and the display device therefor.

2. Description of Related Art

There are various types of devices (hereinafter, transparent panel devices) capable of allowing a user to view an object through a transparent screen. For example, the user may view objects through a transparent screen attached to the transparent panel device, such as a large format display (LFD), an electronic display board, a windshield of a vehicle, or a head-mounted display (HMD).

In order to adjust the position and properties of user interface (UI) content displayed on the transparent screen, the display device needs to determine whether the user's focus is on a background object behind the transparent screen or is on the transparent screen, provide the UI content to the user on the front or rear of the transparent screen, and adjust the UI content according to movement of the user, a background object, and the screen.

However, display devices in the related art display UI content only for a single user looking at a transparent screen, and are unable to recognize whether the user is looking at the transparent screen or a background object.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of identifying whether a user is looking at information on a transparent screen and a background object behind the transparent screen, and determining the position and content of the information displayed on the transparent screen according to a result of the identifying, and a device therefor.

Another aspect of the disclosure is to provide a method of, when one or more users are looking at a transparent screen, identifying whether each user is looking at information on the transparent screen and a background object behind the transparent screen, and determining the position and content of information displayed on the transparent screen according to a result of the identifying, and a device therefor.

Additional aspects will be set forth in part in the description which follows and, in part, will be apparent from the description, or may be learned by practice of the presented embodiments.

In accordance with an aspect of the disclosure, a method of controlling a display device is provided. The method includes a transparent screen, the method including recognizing a position of a user in front of the transparent screen and an eye gaze of the user looking at the transparent screen, recognizing a position of a background object behind the transparent screen, estimating, based on a distance between the transparent screen and the user, and a direction of the eye gaze of the user, a minimum angular change of the eye gaze by which the display device is able to detect a change in the eye gaze, displaying, on the transparent screen, information related to the background object when the background object is at a position within the minimum angular change of the eye gaze from a current eye gaze of the user, and, when the user moves, predicting the eye gaze changing according to a movement speed of the user and moving the related information such that the related information is displayed at a position on the transparent screen out of the minimum angular change of the eye gaze from the current eye gaze of the user.

In accordance with another aspect of the disclosure, a display device is provided. The display device identify whether a user is looking at information displayed on a transparent screen and a background object behind the transparent screen, determine the position and content of information displayed on the transparent screen according to a result of the identifying, and determine properties of the information.

According to embodiments of the disclosure, when one or more users are looking at a transparent screen, the display device may identify whether each user is looking at information on the transparent screen and a background object behind the transparent screen, and determine the position and content of information displayed on the transparent screen according to a result of the identifying.

Other aspects, advantages, and salient features of the disclosure will become apparent to those of skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a diagram illustrating a situation in which a point of eye gaze of a user moves from a background object to information displayed on a transparent screen according to an embodiment of the disclosure;

FIG. 16 illustrates, in a top-down view and a front view, a situation in which related information is displayed on a transparent screen according to a transparent screen, a user, and a background object according to an embodiment of the disclosure;

FIG. 17 is a diagram illustrating a situation in which a user of FIG. 16 is moving and looking at part of related information according to an embodiment of the disclosure;

FIG. 18 is a diagram illustrating an operation of displaying, on a transparent screen, detailed information of information that a user is looking at in FIG. 17, considering a movement speed of the user according to an embodiment of the disclosure.

The same reference numerals are used to represent the same elements throughout the drawings.

BEST MODE

Figure 1:
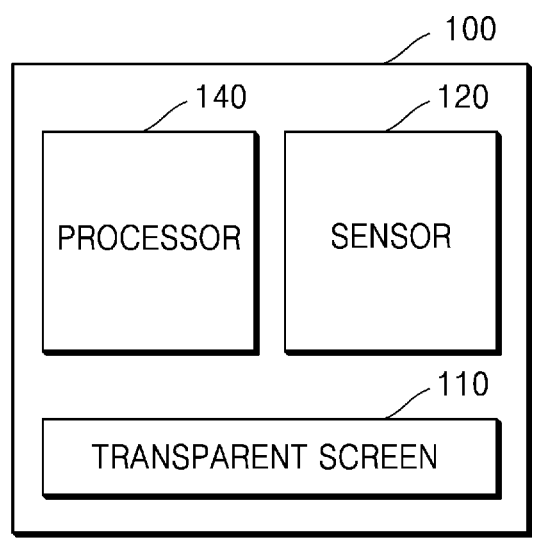
FIG. 1 is a block diagram of a display device according to an embodiment of the disclosure.

According to various embodiments of the disclosure, provided is a method of controlling a display device including a transparent screen, the method includes recognizing a position of a user in front of the transparent screen and an eye gaze of the user looking at the transparent screen, recognizing a position of a background object behind the transparent screen, estimating, based on a distance between the transparent screen and the user, and a direction of the eye gaze of the user, a minimum angular change of the eye gaze by which the display device is able to detect a change in the eye gaze, displaying, on the transparent screen, information related to the background object when the background object is at a position within the minimum angular change of the eye gaze from a current eye gaze of the user, and, when the user moves, predicting the eye gaze changing according to a movement speed of the user and moving the related information such that the related information is displayed at a position on the transparent screen out of the minimum angular change of the eye gaze from the current eye gaze of the user.

According to an embodiment of the disclosure, the estimating of the minimum angular change of the eye gaze includes detecting a change from a first eye gaze with which the user looks at a first point, to a second eye gaze with which the user looks at a second point, and determining, as the detectable minimum angular change of the eye gaze, a minimum angle by which the change between the first eye gaze and the second eye gaze is detected.

According to an embodiment of the disclosure, the estimating of the minimum angular change of the eye gaze includes determining a probability distribution of a first point that the user at a current distance from the transparent screen is most likely looking at, and a first entire area that the user is likely looking at.

According to an embodiment of the disclosure, the estimating of the minimum angular change of the eye gaze may include determining a second point that the user at the current distance is most likely looking at after a preset time period T, and a second entire area that the user is likely looking at.

According to an embodiment of the disclosure, the recognizing of the position of the background object behind the transparent screen includes classifying background objects behind the transparent screen into stationary objects and moving objects, classifying the detected background objects by color, color pattern, and angular diameter, and determining whether the detected background objects are stored in a database.

According to an embodiment of the disclosure, the recognizing of the position of the user in front of the transparent screen and the eye gaze of the user looking at the transparent screen may include detecting at least one of the position of the user, the movement speed and a moving direction of the user, the distance between the transparent screen and the user, or a head position of the user, and, when the user moves, the predicting of the eye gaze changing according to the movement speed of the user may include predicting the position of the user and the head position of the user after a certain time period according to the movement speed of the user.

According to an embodiment of the disclosure, the recognizing of the position of the background object behind the transparent screen may include detecting, when there is no information displayed in an area on the transparent screen that the user is looking at, the background object behind the transparent screen, and the displaying, on the transparent screen, of the information related to the background object may include displaying, when the background object is identified, the information related to the background object, at a position on the transparent screen that does not obscure the background object.

According to an embodiment of the disclosure, the displaying of the information related to the background object at the position on the transparent screen that does not obscure the background object may include determining a position at which the related information is displayed, such that a distance between a position of the background object appearing on the transparent screen and the related information displayed on the transparent screen is greater than the minimum angular change of the eye gaze.

According to an embodiment of the disclosure, the displaying, on the transparent screen, of the information related to the background object may include changing the related information displayed on the transparent screen according to a situation at a current position of the user after a certain time period has elapsed from a current time point.

According to an embodiment of the disclosure, the displaying, on the transparent screen, of the information related to the background object may include detecting that a point of the eye gaze moves from the background object to the related information.

According to an embodiment of the disclosure, the displaying, on the transparent screen, of the information related to the background object may include, when it is detected that, after the related information is displayed, a point of the eye gaze moves to the background object behind the transparent screen without moving to the related information and is fixed for a certain time period or longer, reducing the number of items of the related information displayed on the transparent screen.

The displaying, on the transparent screen, of the information related to the background object may include, when it is detected that a point of the eye gaze moves from the background object behind the transparent screen to the related information displayed on the transparent screen, alternately displaying various pieces of related information corresponding to various properties of the background object.

According to an embodiment of the disclosure, the displaying, on the transparent screen, of the information related to the background object includes when it is detected that, after the related information is displayed, a point of the eye gaze moves to the related information, moves back to the background object, and moves back to the related information, analyzing a field of interest of the user, and displaying information related to the background object according to the field of interest of the user, and the field of interest of the user may include components of the background object and content of the related information.

According to various embodiments of the disclosure, provided is a display device includes a transparent screen, a sensor configured to recognize an object in front of the transparent screen and an object behind the transparent screen, at least one processor configured to receive a position of a user in front of the transparent screen and an eye gaze of the user looking at the transparent screen, which are recognized by using the sensor, receive a position of a background object behind the transparent screen, which is recognized by using the sensor, estimate, based on a distance between the transparent screen and the user, and a direction of the eye gaze of the user, a minimum angular change of the eye gaze by which the display device is able to detect a change in the eye gaze, and display, on the transparent screen, information related to the background object when the background object is at a position within the minimum angular change of the eye gaze from a current eye gaze of the user, and the at least one processor may be further configured to, when the user moves, predict the eye gaze changing according to a movement speed of the user and move the related information to be displayed at a position on the transparent screen out of the minimum angular change of the eye gaze from the current eye gaze of the user.

According to an embodiment of the disclosure, the transparent screen may be a transparent film or a transparent panel capable of displaying digital information.

According to an embodiment of the disclosure, the at least one processor may be further configured to detect a change from a first eye gaze with which the user looks at a first point, to a second eye gaze with which the user looks at a second point, and determine, as the detectable minimum angular change of the eye gaze, a minimum angle by which the change between the first eye gaze and the second eye gaze is detected.

According to an embodiment of the disclosure, the at least one processor may be further configured to determine a probability distribution of a first point that the user at a current distance from the transparent screen is most likely looking at, and a first entire area that the user is likely looking at.

According to an embodiment of the disclosure, the at least one processor may be further configured to determine a second point that the user at the current distance is most likely looking at after a preset time period T, and a second entire area that the user is likely looking at.

According to various embodiments of the disclosure, provided is at least one non-transitory computer-readable recording medium having recorded thereon a program code for executing, on a computer, the method of controlling a display device including a transparent screen.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As the disclosure allows for various changes and numerous embodiments of the disclosure, particular embodiments will be illustrated in the drawings and described below. However, this is not intended to limit the disclosure to particular modes of practice, and it is to be appreciated that all changes, equivalents, and substitutes that do not depart from the spirit and technical scope of the disclosure are encompassed in the disclosure.

In describing embodiments of the disclosure, detailed explanations of the related art are omitted when it is deemed that they may unnecessarily obscure the gist of the disclosure. In addition, numbers (e.g., 'first' and 'second') used in the description of embodiments are intended to merely distinguish one component from another.

In addition, in the specification, it should be understood that when components are "connected" or "coupled" to each other, the components may be directly connected or coupled to each other, but may alternatively be connected or coupled to each other with a component therebetween, unless specified otherwise.

In addition, as used herein, a component expressed as, for example, '... er (or)', '... unit', '... module', or the like, may denote a unit in which two or more components are combined into one component or one component is divided into two or more components according to its function. In addition, each component to be described below may additionally perform, in addition to its primary function, some or all of functions of other components take charge of, and some functions among primary functions of the respective components may be exclusively performed by other components.

Hereinafter, various embodiments according to the technical spirit of the disclosure will be described below.

FIG. 1 is a block diagram of a display device according to an embodiment of the disclosure.

Referring to FIG. 1, a display device 100 according to an embodiment includes a transparent screen 110, a sensor 120, and a processor 140.

The transparent screen 110 according to an embodiment is a transparent panel capable of displaying digital information, and may be a rigid panel or a bendable or foldable film, and there is no limitation on its shape or material.

The sensor 120, according to an embodiment of the disclosure, may recognize an object in front of the transparent screen 110 and an object in rear of the transparent screen 110. The sensor 120, according to an embodiment of the disclosure, may recognize an object in front of the transparent screen 110 and an object in rear of the transparent screen 110 through one sensing module. The sensor 12,0 according to an embodiment of the disclosure, may include a first sensing module and a second sensing module that are spatially separated from each other, the first sensing module may recognize an object in front of the transparent screen 110, and the second sensing module may recognize an object in rear of the transparent screen 110. The sensor 120, according to an embodiment of the disclosure, may recognize an eye gaze of a user looking at the transparent screen 110.

The processor 140, according to an embodiment of the disclosure, may receive a position and an eye gaze of the user looking at and in front of the transparent screen 110, which are recognized by using the sensor 120. The processor 140, according to an embodiment of the disclosure, may receive a position of a background object in rear of the transparent screen, which is recognized by using the sensor unit 120.

The processor 140, according to an embodiment of the disclosure, may identify the background object recognized through the sensor 120.

For example, when a code is printed on the background object, the sensor 120 may read identification information of the background object and transmit the identification information to the processor 140. The processor may determine properties of the background object based on the transmitted identification information. An identification number of the background object and information related to the background object corresponding to the identification number may be included in a server (not shown) or a memory (not shown) accessible by the display device 100. For example, when the display device 100 is in a shop, the sensor 120 may read a code of a product placed behind the transparent screen 110, and the processor 140 may search a database stored in the server (not shown) or the memory (not shown) to obtain information about the product corresponding to the product code transmitted from the sensor 120.

As another example, the database stored in the server (not shown) or the memory (not shown) stores properties of a background object by learning the shape, size, color, or the like, of the background object. The processor 140 may search the database stored in the server (not shown) or the memory (not shown) to obtain the properties of the background object corresponding to the shape, size, color, or the like, of the background object recognized through the sensor 120.

The processor 140, according to an embodiment of the disclosure, may predict the distance between the user and the transparent screen 110 based on the position of the user recognized through the sensor 120. Based on the distance of the user, the direction of the user's head, and an eye gaze that are recognized through the sensor 120, the processor 140, according to an embodiment of the disclosure, may determine the direction of the eye gaze. Based on the position of a background object recognized through the sensor 120, the processor 140, according to an embodiment of the disclosure, may predict the distance between the background object and the transparent screen 110.

The processor 140, according to an embodiment of the disclosure, may estimate a minimum angular change of eye gaze, which is detectable by the display device 100, based on the distance between the transparent screen and the user, and the direction of the eye gaze of the user. When the background object is at a position within the minimum angular change of eye gaze from the current eye gaze of the user, the processor 140, according to an embodiment of the disclosure, may display, on the transparent screen, information related to the background object.

When a movement of the user is detected, the processor 140, according to an embodiment of the disclosure, may predict an eye gaze that is changed according to the movement speed of the user, move the related information to be displayed at a position on the transparent screen out of the minimum angular change of eye gaze from the current eye gaze of the user.

Hereinafter, a method of controlling the display device 100 according to an embodiment to display, on the transparent screen 110, information related to a background object according to the positions of the user and the background object will be described below with reference to FIG. 2.

Figure 2:
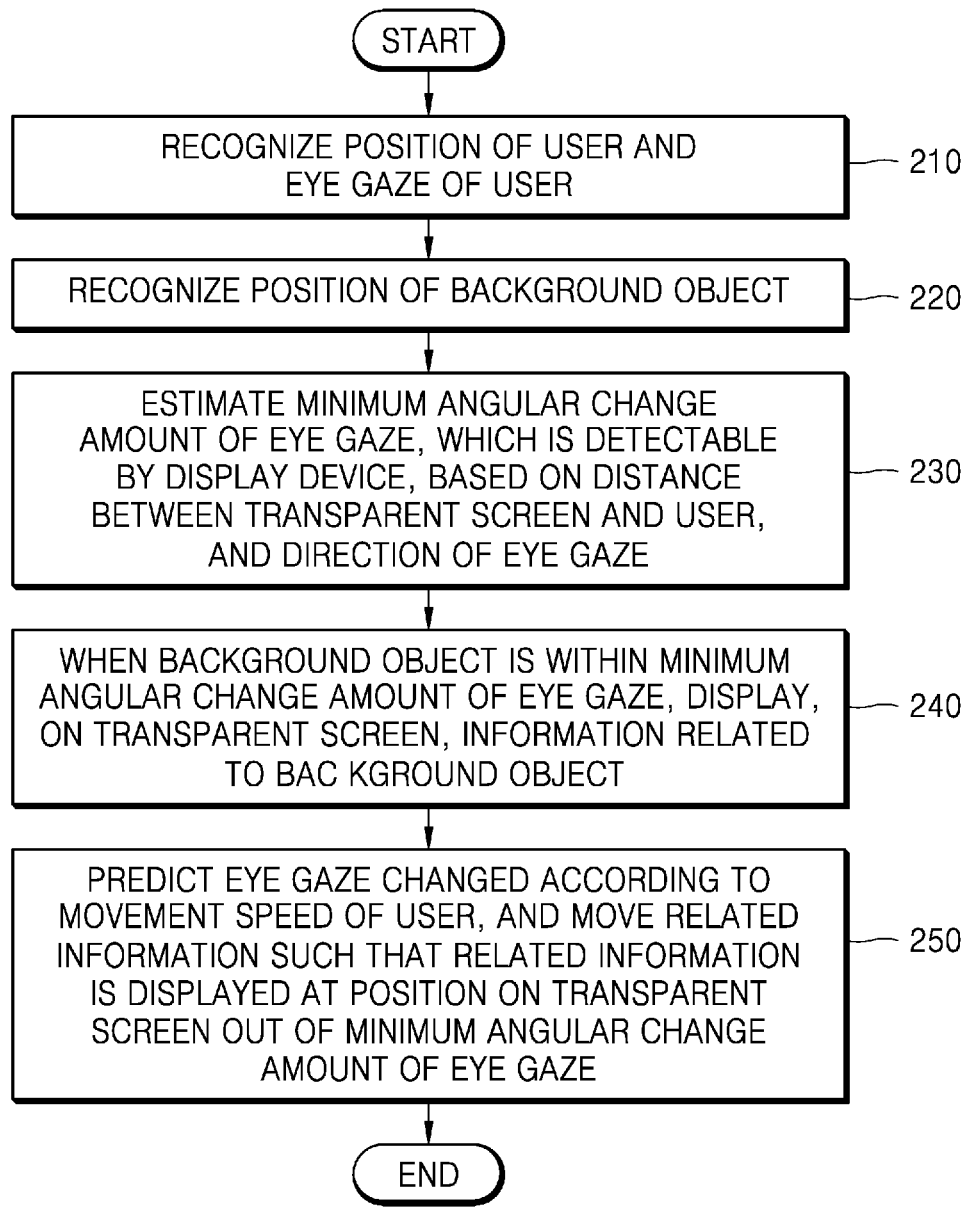
FIG. 2 is a flowchart of a method of controlling a display device including a transparent screen according to an embodiment of the disclosure.

FIG. 2 is a flowchart of a method of controlling a display device including a transparent screen according to an embodiment of the disclosure.

Referring to FIG. 2, in operation 210, the sensor 120 may recognize the position of a user in front of the transparent screen 110, and an eye gaze of the user looking at the transparent screen.

The sensor 120, according to an embodiment of the disclosure, may detect at least one of the position of the user, the movement speed and moving direction of the user, the distance between the transparent screen 110 and the user, or the head position of the user.

When the sensor 120 according to an embodiment detects a movement of the user, the processor 140 may measure the movement speed of the user based on a change in the position of the user. The processor 140 may predict the position of the user and the head position of the user after a preset time period T according to the movement speed of the user.

In operation 220, the sensor 120 may recognize the position of a background object behind the transparent screen 110. The processor 140, according to an embodiment of the disclosure, may classify background objects behind the transparent screen 110 into stationary objects and moving objects. For example, the processor 140 may classify the detected background objects by color, color pattern, and angular diameter. The processor 140 may classify the background objects by clear size when viewed from the perspective of the user standing in front of the transparent screen 110. The processor 140 may determine whether the detected background objects are stored in the database.

In operation 230, the processor 140 may estimate a minimum angular change of eye gaze, which is detectable by the display device, based on the distance between the transparent screen 110 and the user, and the direction of an eye gaze of the user.

The processor 140, according to an embodiment of the disclosure, may detect a change from a first eye gaze with which the user looks at a first point, to a second eye gaze with which the user looks at a second point. The processor 140 may determine, as the detectable minimum angular change, the minimum angle by which the change between the first eye gaze and the second eye gaze is detected.

The processor 140, according to an embodiment of the disclosure, may determine a probability distribution of a first point that the user at a current distance from the transparent screen is most likely looking at, and a first entire area that the user is likely looking at. The processor 140, according to an embodiment of the disclosure, may determine a second point that the user is most likely looking at after a preset time period T, and a second entire area that the user is likely looking at.

In operation 240, when the background object is at a position within the minimum angular change of eye gaze from the current eye gaze of the user, the processor 140 may display, on the transparent screen 110, information related to the background object.

The related information may be a text object or a graphic object. The content of the related information may include properties of the background object.

When there is no information being currently displayed in an area on the transparent screen 110 that the user is looking at, the processor 140 may instruct the sensor 120 to detect a background object behind the transparent screen 110. When a background object is identified, the processor 140 may control the transparent screen 110 to display information related to the background object, at a position on the transparent screen 110 that does not obscure the background object.

The processor 140 may determine the position at which the related information is displayed, such that the distance between the position of the background object appearing on the transparent screen 110 and the related information displayed on the transparent screen 110 is greater than the minimum angular change of eye gaze.

In operation 250, when the sensor 120 detects a movement of the user, the processor 140 may measure the movement speed of the user and predict the eye gaze changed according to the movement speed of the user. The processor 140 may move the related information to be displayed on at a position on the transparent screen out of the minimum angular change of eye gaze from the current eye gaze of the user.

The processor 140 may change the related information displayed on the transparent screen according to the situation at the user's current position after a preset time period has elapsed from the current time point. More particularly, the sensor 120 may detect that the point of eye gaze moves from the background object to the related information or moves from the related information to the background object. Accordingly, the processor 140 may determine whether to continue to display or remove the related information, or whether to change the content of the related information.

For example, when the point of eye gaze of the user does not move from the background object to the information related to the background object after a certain time period has elapsed after the related information is displayed on the transparent screen 110, the processor 140 may change the content of, or remove the related information displayed on the transparent screen. When the sensor 120 detects that the point of eye gaze of the user moves from the related information to the background object after the related information is displayed on the transparent screen 110 and is fixed for a certain time period or longer, the processor 140 may reduce or remove the number of pieces of the related information displayed on the transparent screen 110.

According to an embodiment of the disclosure, when the sensor 120 detects that the point of eye gaze moves from the background object behind the transparent screen 110 to the related information displayed on the transparent screen 110, the processor 140 may alternately display various pieces of the related information corresponding to various properties of the background object.

According to an embodiment of the disclosure, when the sensor 120 detects that, after the related information is displayed, the point of eye gaze moves to the related information, moves to the background object, and moves back to the related information, the processor 140 may analyze a field of interest of the user and display information related to the background object according to the field of interest of the user. For example, the field of interest of the user may be analyzed based on whether the user is looking at which component of the background object or the related information.

Hereinafter, an operation, performed by the display device 100, of controlling the transparent screen 110 to display related information on the transparent screen 110 according to the position of the user in front of the transparent screen 110 and a background object behind the transparent screen 110 will be described below with reference to FIGS. 3 to 19.

Figure 3:
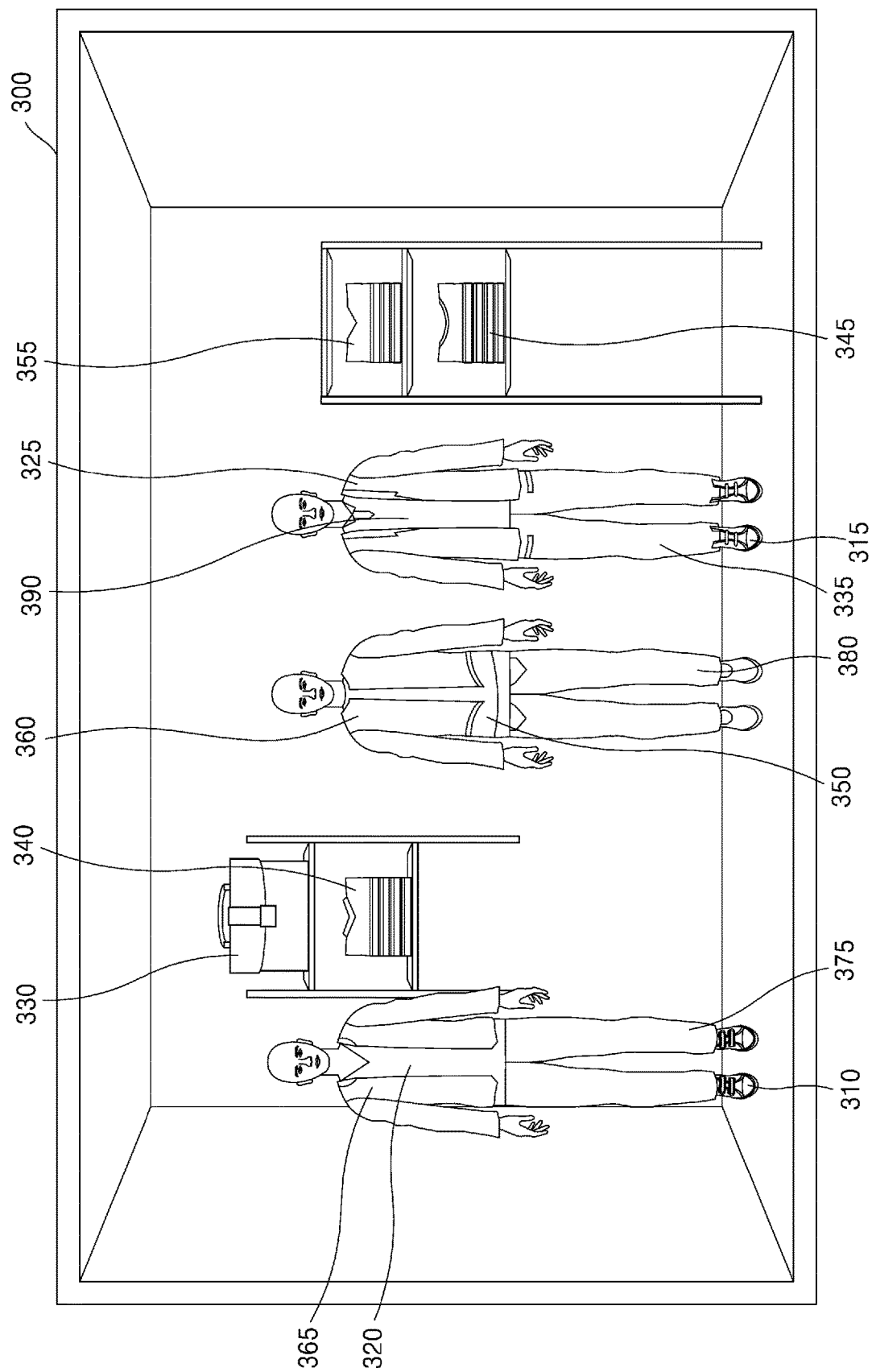
FIG. 3 is a diagram illustrating a situation in which a background object is transmitted through a transparent screen according to an embodiment of the disclosure.

FIG. 3 is a diagram illustrating a situation in which a background object is transmitted through a transparent screen according to an embodiment of the disclosure.

Referring to FIG. 3, the sensor 120, according to an embodiment of the disclosure, may detect background objects 310, 315, 320, 325, 330, 335, 340, 345, 350, 355, 360, 365, 375, 380, and 390 behind a transparent screen 300, and the processor 140 may classify the background objects 310, 315, 320, 325, 330, 335, 340, 345, 350, 355, 360, 365, 375, 380, and 390 by properties. In the case of FIG. 3, all of the background objects 310, 315, 320, 325, 330, 335, 340, 345, 350, 355, 360, 365, 375, 380, and 390 are stationary, and thus the processor 140 may classify all of the background objects 310, 315, 320, 325, 330, 335, 340, 345, 350, 355, 360, 365, 375, 380, and 390 as stationary objects. In addition, the processor 140 may classify the background objects 310, 315, 320, 325, 330, 335, 340, 345, 350, 355, 360, 365, 375, 380, and 390 by type, for example, into jackets, shirts, bottoms, and shoes, or by color, for example, black, yellow, and white.

Figure 4:
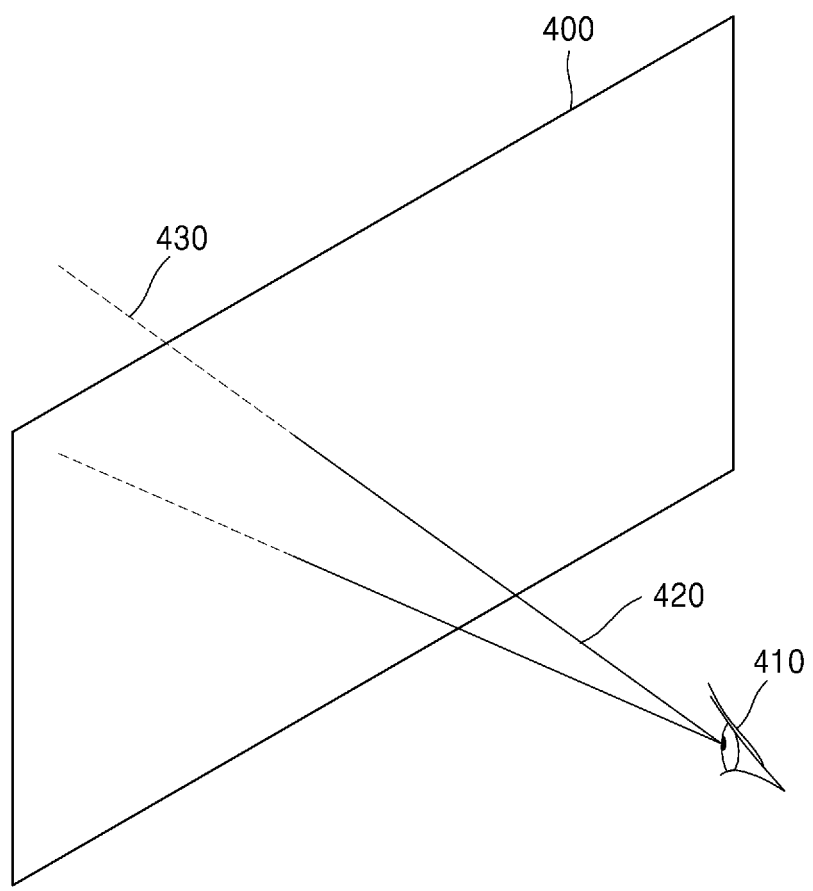
FIG. 4 illustrate a direction of an eye gaze of a user looking at a transparent screen according to an embodiment of the disclosure.

FIG. 4 illustrate a direction of an eye gaze of a user looking at a transparent screen according to an embodiment of the disclosure.

Referring to FIG. 4, the processor 140, according to an embodiment of the disclosure, may determine the direction of an eye gaze of a user 410 looking at a transparent screen 400, within a range of accuracy of the sensor 120 to detect an eye gaze. An eye gaze 420 indicated by solid lines is a gaze between the transparent screen 400 and the user 410, and an eye gaze 430 indicated by dotted lines is a gaze passing through and beyond the transparent screen 400.

Figure 5:
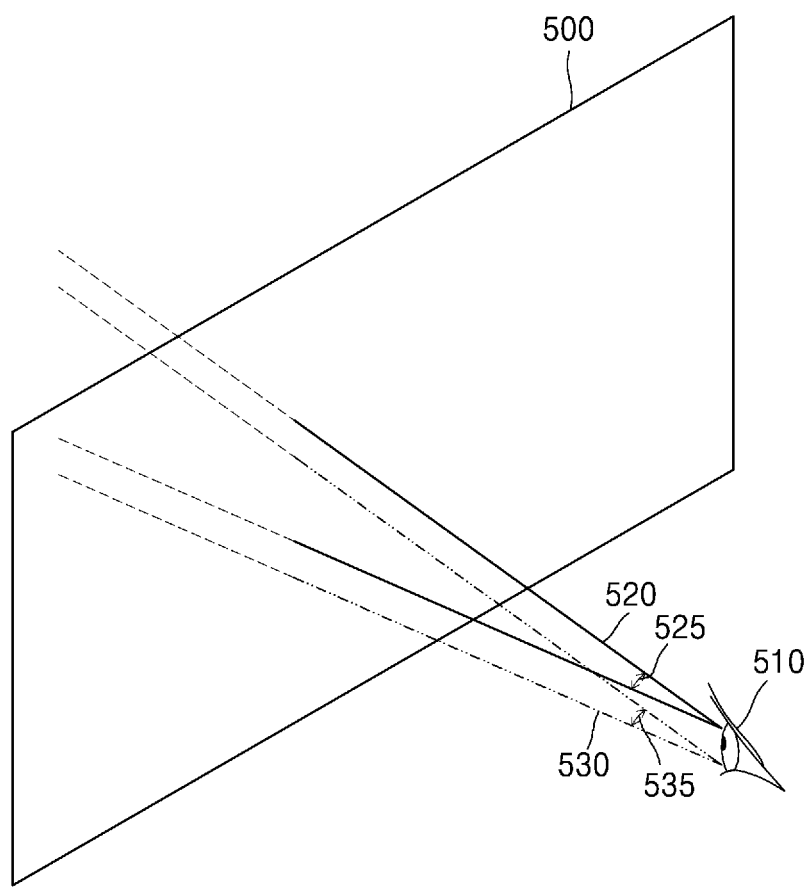
FIG. 5 is a diagram illustrating a minimum angular change by which a display device is able to detect movement of an eye gaze of a user according to an embodiment of the disclosure.

FIG. 5 is a diagram illustrating a minimum angular change by which a display device according to an embodiment is able to detect a movement of an eye gaze of a user according to an embodiment of the disclosure.

Referring to FIG. 5, the processor 140 may measure the distance between a user 510 and a transparent screen 500. Based on the distance between the user 510 and the transparent screen 500, an eye gaze, and the accuracy of the sensor 120, the processor 140 may specify the minimum angular change for detecting a movement of the eye gaze. For example, when the eye gaze of the user moves from a first eye gaze 520 to a second eye gaze 530, it is required that the angle between the first eye gaze 520 and the second eye gaze 530 be at least angular changes 525 and 535, in order for the sensor 120 to detect the movement of the eye gaze. In this case, the angular changes 525 and 535 may be determined as the detectable minimum angular change of eye gaze.

FIG. 6 is diagram illustrating a situation in which a point of eye gaze of a user moves from a background object to information displayed on a transparent screen according to an embodiment of the disclosure.

Referring to FIG. 6, the point of eye gaze of a user 610 is moving from a background object 620 behind a transparent screen 600 to a text object 630 displayed on the transparent screen 600. When the angle between the background object 620 and the text object 630 is greater than the detectable minimum angular change, the processor 140 may accurately detect that the point of eye gaze of the user 610 has moved from the background object 620 to the text object 630. The angular diameter between a point at which the eye gaze toward the background object 620 reaches the transparent screen 600 and the text object 630 needs to be greater than the resolution of accuracy for the processor 140 to detect an eye gaze. When the distance between the user 610 and the transparent screen 600 is given, the resolution of the accuracy for detecting an eye gaze may also be given. For example, the resolution of the accuracy for detecting an eye gaze may be determined to be an angular diameter of 5°. In order to accurately recognize that a point of eye gaze of the user 610 moves from a first object to a second object, the second object needs to be at a point apart from the first object by a distance corresponding to an angular diameter greater than 5°, for example, 6° or 7°.

Figure 7:
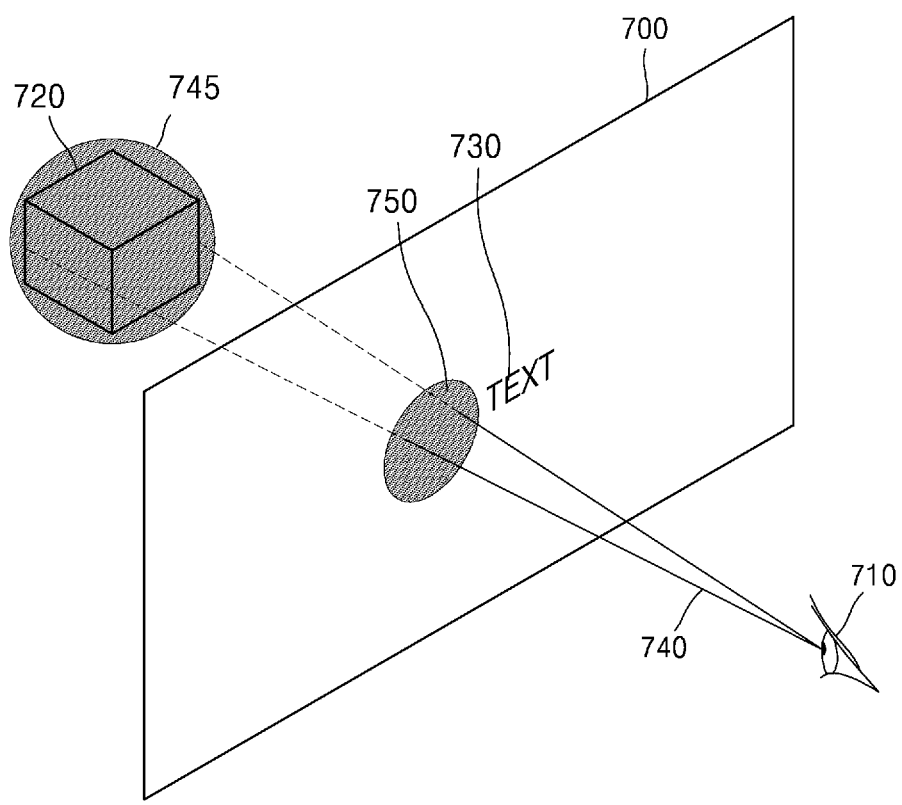
FIG. 7 is a diagram illustrating a recognizable area on a transparent screen according to an eye gaze of a user looking at a background object according to an embodiment of the disclosure.

FIG. 7 is a diagram illustrating a recognizable area on a transparent screen according to an eye gaze of a user looking at a background object according to an embodiment of the disclosure.

Figure 8:
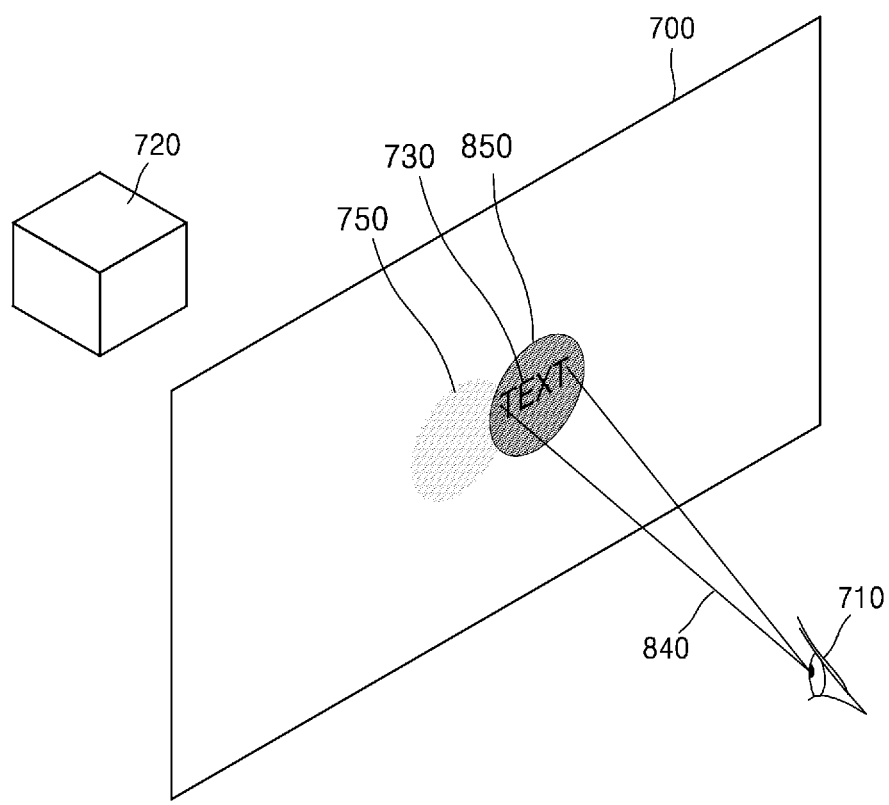
FIG. 8 is a diagram illustrating a situation in which an area recognizable with an eye gaze toward a background object and an area recognizable with an eye gaze toward related information overlap each other on a transparent screen according to an embodiment of the disclosure.

FIG. 8 is a diagram illustrating a situation in which an area recognizable with an eye gaze toward a background object and an area recognizable with an eye gaze toward related information overlap each other on a transparent screen according to an embodiment of the disclosure.

Referring to FIGS. 7 and 8, when a first eye gaze 740 of a user 710 is toward a background object 720 beyond a screen 700, the accuracy resolution of the eye gaze may be represented by a probability distribution. A range of an area in which the background object 720 is recognizable with the first eye gaze 740 may be indicated as a background area 745 according to the probability distribution.

According to an embodiment of the disclosure, the area according to the probability distribution may be determined considering the distance between the user 710 and the sensor 120, the accuracy of the eye gaze, the distance between the user 710, the background object 720, the size of a text object 730 displayed on the screen 700, the size of the entire background object 720, and the like.

The area according to the probability distribution may be indicated as an ellipse, the center of which indicates a point that the user 710 is most likely looking at. As the distance between a point and the center of the ellipse increases, the probability that the user 710 is looking at the point decreases toward 0. The size of the ellipse may be determined according to system accuracy, for example, an angular diameter. Because the probability that the user 710 is looking at each point is determined according to the distance from the user 710 to the object, the size of the ellipse of an area 750 of the text object 730 may be relatively small, and the size of the ellipse of an area 745 of the background object 720 may be relatively large.

An elliptical area on the screen 700 recognizable with the first eye gaze 740 on the area 745 of the background object 720 behind the screen may be indicated as the first area 750 according to the probability distribution. According to the first eye gaze 740, the text object 730 is not included in the first area 750, and thus the processor 140 may determine that 'the text object 730 is unrecognizable by the user 710 with the first eye gaze 740'.

When the eye gaze of the user 710 moves from the first eye gaze 740 to a second eye gaze 840, an area on the screen 700 recognizable with the second eye gaze 840 is changed to a second area 850 according to a probability distribution. The second area 850 and the text object 730 overlap each other, and thus the processor 140 may determine that 'the text object 730 is recognizable by the user 710 with the second eye gaze 840'. However, because the second eye gaze 840 deviates from the background area 745, the processor 140 may determine that 'the background object 720 is unrecognizable with the second eye gaze 840'.

When the first area 750 according to the first eye gaze 740 and the second area 850 according to the second eye gaze 840 overlap each other, the processor 140 may be unable to recognize the background object 720 and a text object 830 with a probability of 100% due to the first eye gaze 740 on the background object 720 and the second eye gaze 840 on the text object 830. More particularly, this means that the user 710 recognizes, according to the probability distribution, the background object 720 with a certain probability and recognizes the text object 830 with a certain probability. The processor 140 needs not to allow such a conflicting situation. Accordingly, in order to resolve such a conflicting situation, the processor 140 may adjust the position at which the text object 830 is displayed. An example of this will be described below with reference to FIG. 9.

Figure 9:
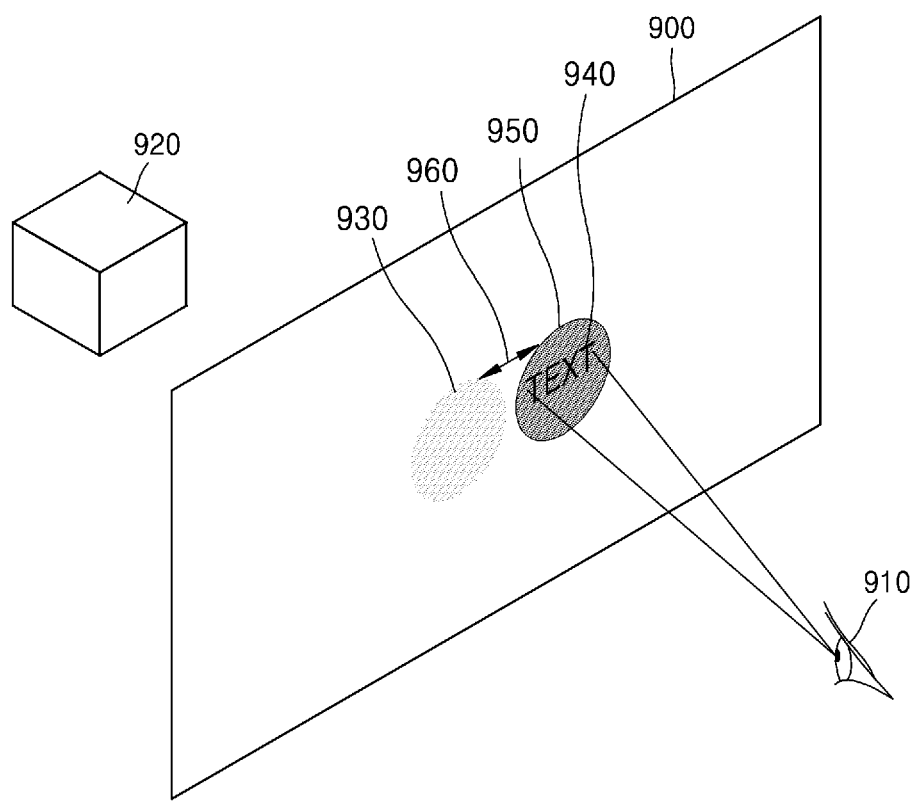
FIG. 9 is a diagram illustrating an operation of moving a position at which related information is displayed on a transparent screen according to an embodiment of the disclosure.

FIG. 9 is a diagram illustrating an operation of moving a position at which related information is displayed on a transparent screen according to an embodiment of the disclosure.

Referring to FIG. 9, a first area 930 represents a recognizable area on a screen 900 according to a probability distribution of a first eye gaze of a user 910 looking at a background object 920. A second area 950 represents a recognizable area according to a probability distribution of a second eye gaze of the user 910 looking at a text object 940 on the screen 900.

The processor 140 may adjust the position of the second area 950 to be spaced a minimum separation distance 960 from the first area 930 such that the first area 930 and the second area 950 do not overlap each other. When the first area 930 and the second area 950 are spaced a minimum separation distance 960 from each other, the processor 140 may recognize whether the user 910 is looking at the background object 920 with the first eye gaze or is looking at the text object 940 with the second eye gaze.

Hereinafter, a method of displaying product-related information on a transparent screen when a user looks, through the transparent screen, at an exhibited product in an actual show window will be described with reference to FIG. 10.

Figure 10:
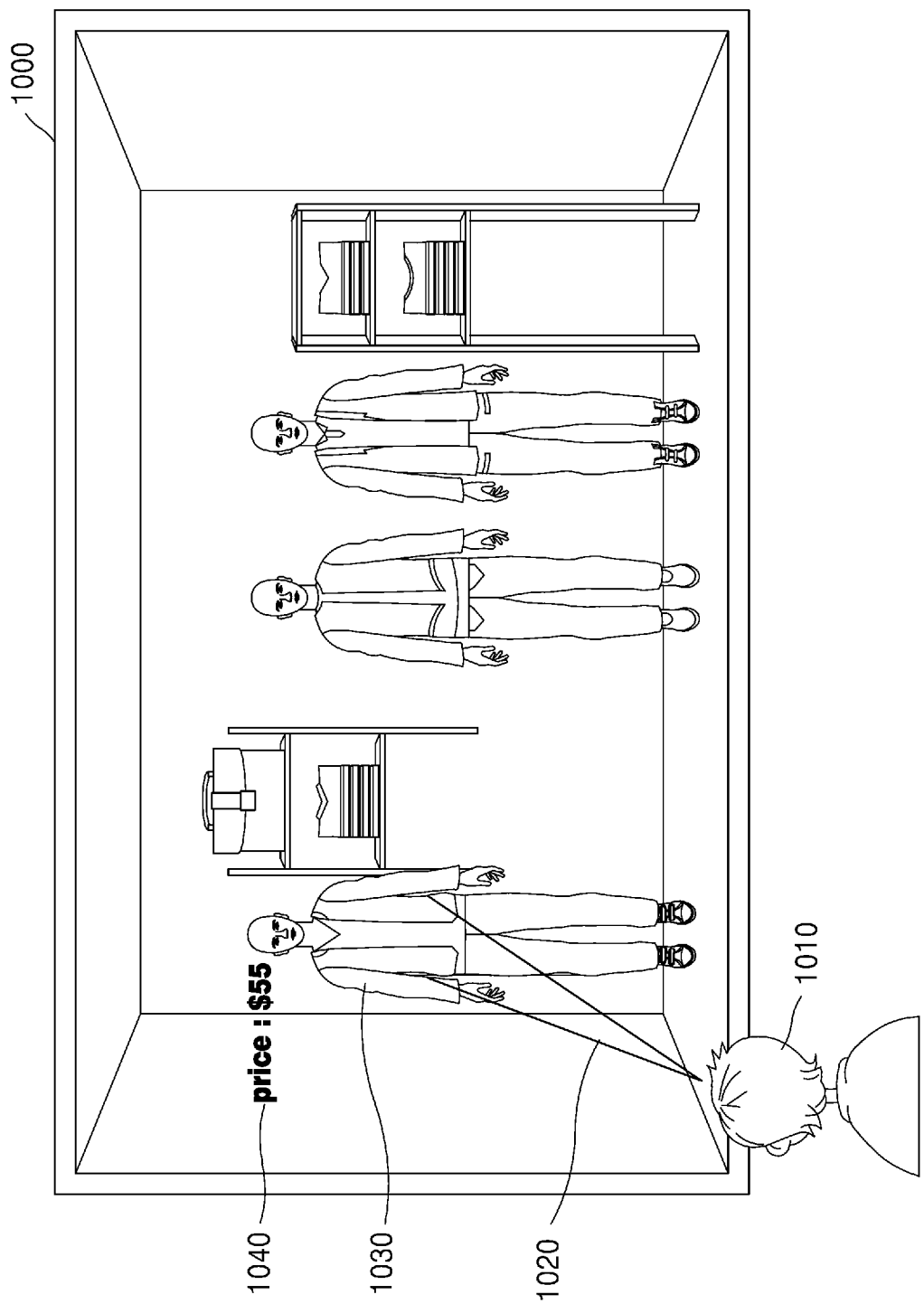
FIG. 10 illustrates a transparent screen, a user, background objects, and position of related information displayed on a transparent screen according to an embodiment of the disclosure.

FIG. 10 illustrates a transparent screen, a user, background objects, and position of related information displayed on a transparent screen according to an embodiment of the disclosure.

Referring to FIG. 10, a user 1010 is looking at an exhibited product 1030 behind a transparent screen 1000. The processor 140 may measure a distance 1020 between the user 1010 and the transparent screen 1000 by using the sensor 120. As described above with reference to FIGS. 7 to 9, when the processor 140 recognizes that the eye gaze of the user is on the exhibited product 1030, the processor 140 may determine to display, on the screen, information (e.g., a text object) 1040 related to the exhibited product 1030. Here, in order to determine the position of the text object 1040 to be displayed on the screen, the processor 140 may determine a first area on the transparent screen 1000 recognizable with the eye gaze of the user 1010 looking at the exhibited product 1030. When the eye gaze of the user is on the text object 1040, the processor 140 may determine the position of the text object 1040 such that a second area formed on the transparent screen 1000 according to a probability distribution does not overlap the first area.

In FIGS. 7 to 10, the user, the transparent screen, and the background object are stationary without moving. However, there may be a situation in which a user is looking at a screen or a background object while moving, a situation in which an object behind a screen is moving, a situation in which a transparent screen is moving (e.g., a window on a public bus or a tram), or a combination thereof.

Hereinafter, a method of controlling the processor 140 to display, on a transparent screen, information related to a background object when a user is moving will be described with reference to FIGS. 11 to 13.

Figure 11:
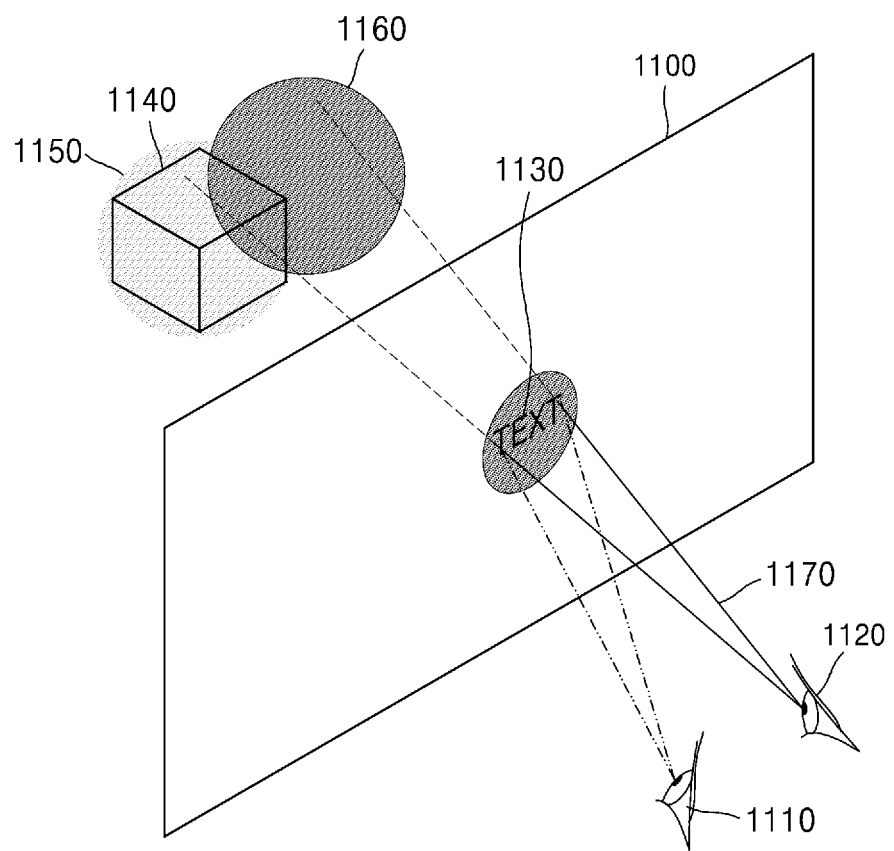
FIG. 11 is a diagram illustrating a situation in which an area formed on a transparent screen according to an eye gaze on a background object after a user moves overlaps an area recognizable according to an eye gaze on related information on a screen according to an embodiment of the disclosure.

FIG. 11 is a diagram illustrating a situation in which an area formed on a transparent screen according to an eye gaze on a background object after a user moves overlaps an area recognizable according to an eye gaze on related information on a screen of the disclosure.

Referring to FIG. 11, only the user moves, and a screen 1100 and a background object 1140 are stationary.

When the user is at a first position 1110, the user may look at a probability distribution area 1130 from which a text object displayed on the screen 1100 may be recognized.

When the user moves from the first position 1110 to a second position 1120 and the eye gaze on the text object extends beyond the screen 1100 to the same distance as the background object, a background area 1160 recognizable with the eye gaze may be formed.

In this case, because a probability distribution area 1150 for recognizing the background object 1140 overlaps the background area 1160 recognizable with the eye gaze, there are both probabilities that the user at the second position 1120 is looking at the background object 1140 and the text object. Accordingly, the processor 140 is unable to determine, with an accuracy of 100%, whether the user at the second position 1120 is looking at the text object or the background object 1140. Therefore, a method, performed by the processor 140, of, in order to avoid such a conflicting situation, predicting a change in an eye gaze 1170 of a user according to a movement speed of the user, and adjusting the position of a text object according to the predicted change will be described below with reference to FIG. 12.

Figure 12:
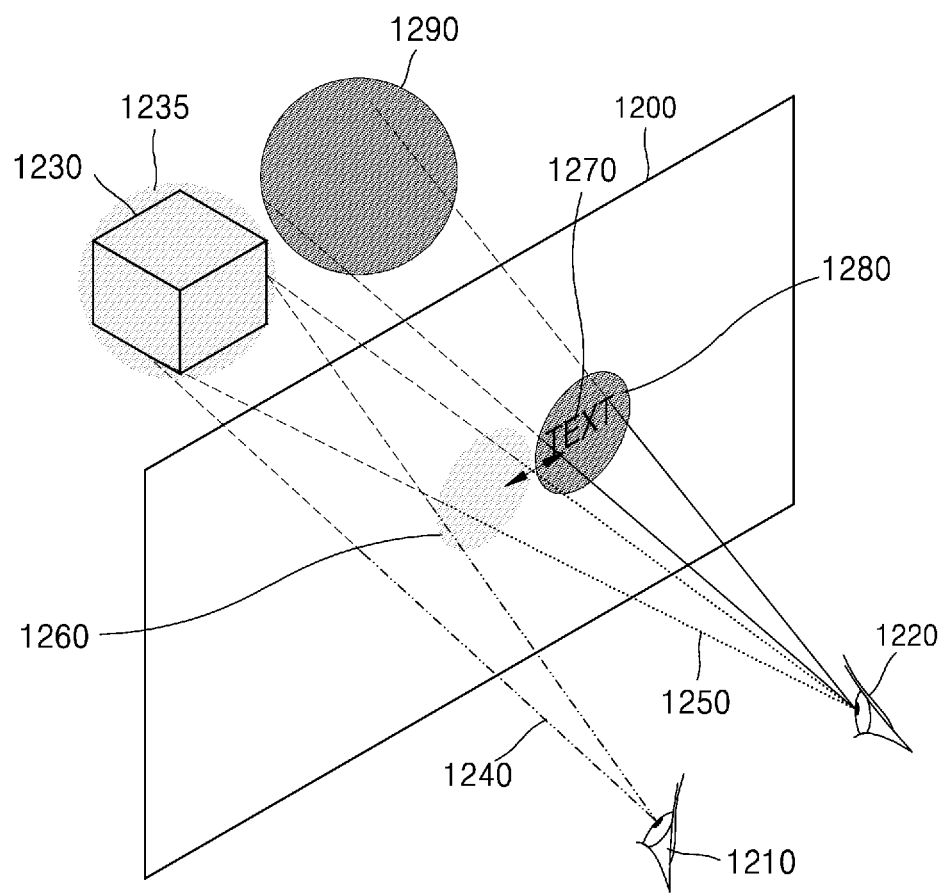
FIG. 12 is a diagram illustrating an operation of moving a position at which related information is displayed on a transparent screen after a user moves according to an embodiment of the disclosure.

FIG. 12 is a diagram illustrating an operation of moving a position at which related information is displayed on a transparent screen after a user moves according to an embodiment of the disclosure.

Referring to FIG. 12, a user at a first position 1210 is looking at a background object 1230. The processor 140 may determine a probability distribution area 1235 in which the user may be recognized as looking at the background object 1230, considering the distance between a screen 1200 and the background object 1230, the distance between the screen 1200 and the user, the actual size of the background object 1230, the accuracy of the sensor 120, and the like.

The processor 140 may predict a movement speed of the user through the sensor 120. It may be expected that the user will move from the first position 1210 to a second position 1220 after a certain time period has elapsed, according to the predicted movement speed. When the user at the second position 1220 looks at the background object 1230, a first probability distribution area 1260 recognizable with an eye gaze 1240 on the background object 1230 may be formed on the screen 1200.

In order to display a text object 1270 on a point on the screen 1200 recognizable by the user who will be at the second position 1220, the processor 140 needs to accurately determine the point of display. When the user looks at the text object 1270 on the screen 1200, a second probability distribution area 1280 may be formed on the screen by the eye gaze 1250. In order that the first probability distribution area 1260 and the second probability distribution area 1280 do not overlap each other, the second probability distribution area 1280 needs to be formed at a position spaced a minimum separation distance from the first probability distribution area 1260. Accordingly, the processor 140 may change the point at which the text object 1270 is displayed, such that the first probability distribution area 1260 and the second probability distribution area 1280 are spaced the minimum separation distance from each other.

When the eye gaze 1250 of the user at the second position 1220 and looking at the text object 1270 extends beyond the screen 1200 to the distance of the background object 1230, a probability distribution area recognizable with the eye gaze 1250 may be extended to a background area 1290.

According to the first probability distribution area 1260 and the second probability distribution area 1280, which spaced the minimum separation distance from each other, the probability distribution area 1235 in which the background object 1230 is recognizable does not overlap the background area 1290 formed by the eye gaze 1250 on the text object 1270. Accordingly, the processor 140 may accurately recognize whether the eye gaze 1250 of the user at the second position 1220 is on the text object 1270 or the background object 1230.

Figure 13:
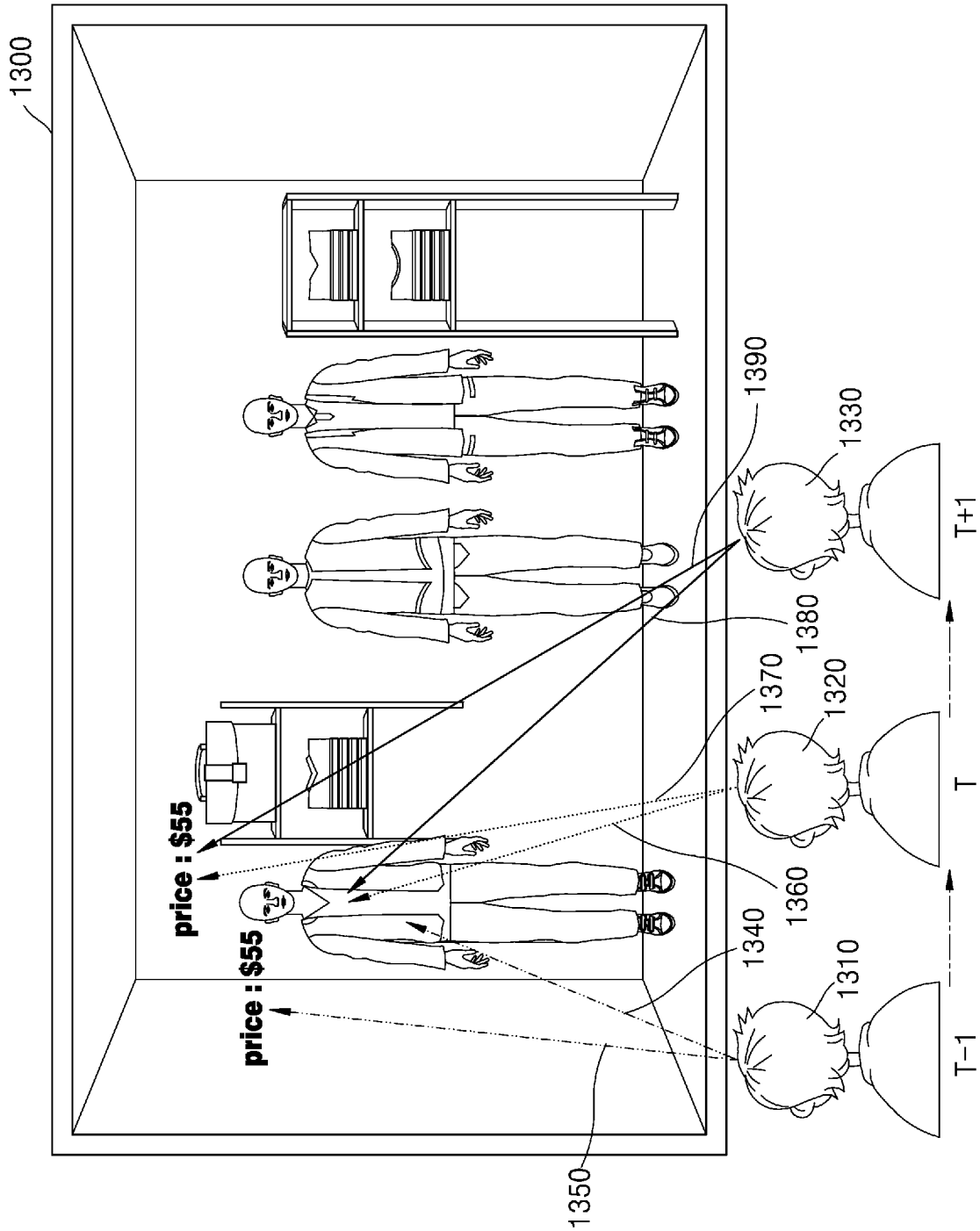
FIG. 13 is a diagram illustrating an operation of repeatedly moving a position at which related information is displayed on a transparent screen, as a user repeatedly moves according to an embodiment of the disclosure.

FIG. 13 is a diagram illustrating an operation of repeatedly moving a position at which related information is displayed on a transparent screen as a user repeatedly moves, according to an embodiment of the disclosure.

Referring to FIG. 13, the processor 140 may determine the position and size of a display area of a text object displayed on a screen 1300, such that a probability distribution area recognizable by the user at a first position 1310 with an eye gaze 1340 on an exhibited product does not overlap a probability distribution area recognizable by the user with an eye gaze 1350 on a text object. The processor 140 may detect the colors of background objects by using the sensor 120 and change the color, font, content, or the like, of a text object to be easily identified in contrast to the colors of the background objects.

When the user moves to a second position 1320, the processor 140 may change the position and size of the display area of the text object such that a probability distribution area recognizable with an eye gaze 1360 on the exhibited product does not overlap a probability distribution area recognizable with an eye gaze 1370 on the text object.

The processor 140 may measure the movement speed of the user based on a history of movements of the user from the first position 1310 to the second position 1320. Accordingly, the processor 140 may predict that the user will move to a third position 1330 after a certain time period. According to a predicted path of movement of the user, the processor 140 may again change the position and size of the display area of the text object such that a probability distribution area recognizable with an eye gaze 1380 at the third position 1330 on the exhibited product does not overlap a probability distribution area recognizable with an eye gaze 1390 on the text object.

For a short time period (e.g., 0.5 seconds), the sensor 120 is unable to detect an eye gaze of the user. The processor 140 does not abruptly move the text object displayed on the screen from one point on the screen to another point. The processor 140 may predict the position of the user, the exhibited product, or the screen in advance, and control the arrangement of a user interface (UI) of the screen to naturally and smoothly change the position and content of the text object.

Hereinafter, a method, performed by the processor 140, of controlling related information displayed on the transparent screen 110 when a plurality of users are looking at a screen or background objects will be described with reference to FIGS. 14 to 15.

Figure 14:
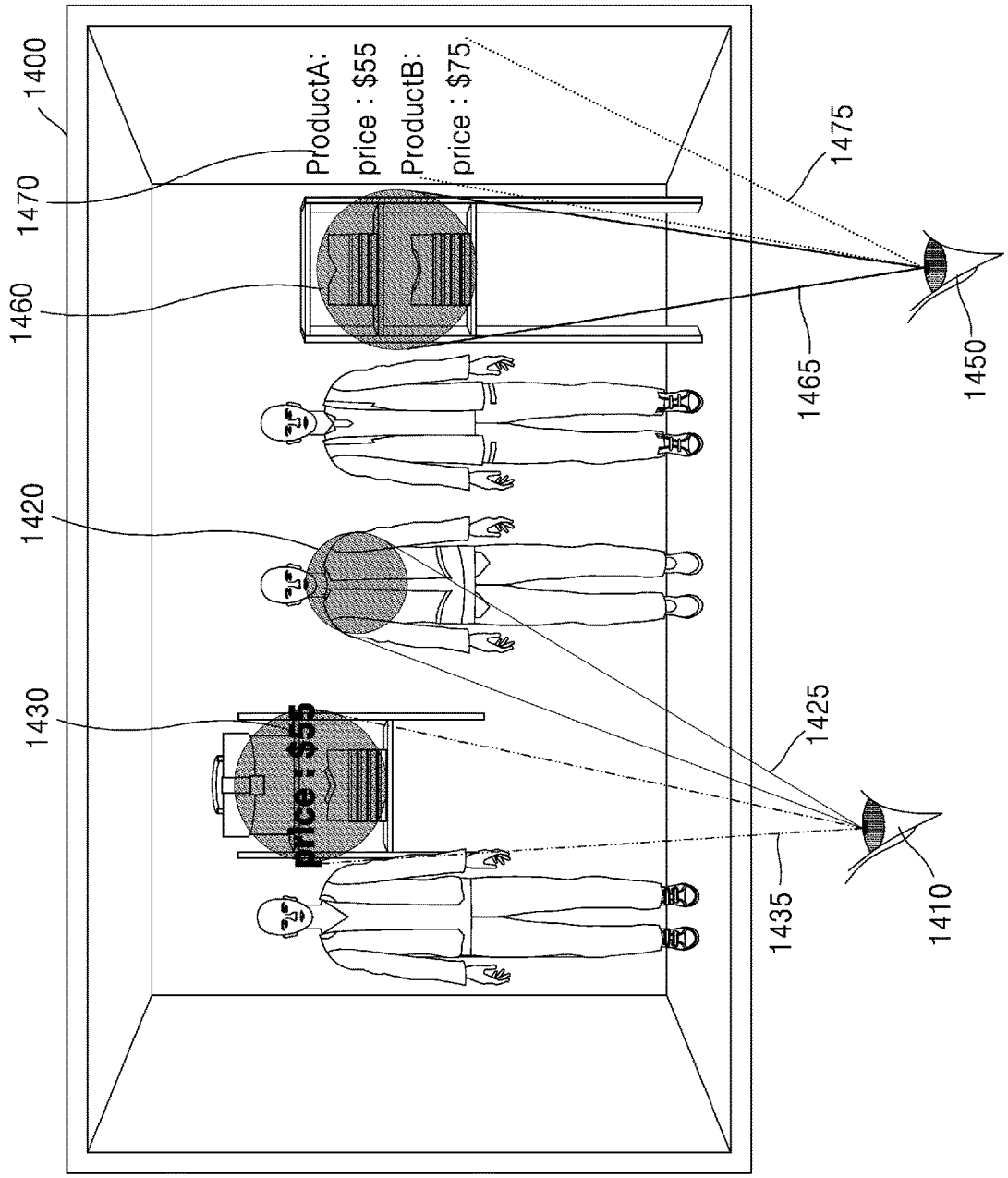
FIG. 14 is a diagram illustrating an operation of displaying related information on a transparent screen for each user when a plurality of users are looking at a transparent screen according to an embodiment of the disclosure.

FIG. 14 is a diagram illustrating an operation of displaying related information on a transparent screen for each user when a plurality of users are looking at a transparent screen according to an embodiment of the disclosure.

Referring to FIG. 14, when the sensor 120 detects that a first user 1410 is looking at a first exhibited product 1420 with a first eye gaze 1425, the processor 140 displays, on the screen 1400, information 1430 related to the first exhibited product 1420. Here, the processor 140 may determine the display position and size of the related information 1430 such that a probability distribution area formed on the screen 1400 by the first eye gaze on the first exhibited product 1420 does not overlap a probability distribution area formed on the screen 1400 by a second eye gaze 1435 on the related information 1430.

It may be detected that the first eye gaze 1425 of the first user 1410 is on the first exhibited product 1420, and at the same time, it may be detected by the sensor 120 that a second user 1450 is looking at a second exhibited product 1460 with a third eye gaze 1465. Even when the sensor 120 detects that a plurality of users are looking at exhibited products beyond the screen 1400 at the same time, the processor 140 may display, on the screen 1400, related information suitable for each exhibited product. The processor 140 may determine the display position and size of related information 1470 such that a probability distribution area formed on the screen 1400 by the third eye gaze on the second exhibited product 1460 does not overlap a probability distribution area formed on the screen 1400 by a fourth eye gaze 1475 on the information 1470 related to the second exhibited product 1460. In addition, when the second exhibited product 1460 includes of a plurality of products, the processor 140 may control the screen 1400 to display information related to each product.

Accordingly, the processor 140 may individually provide related information suitable for interest of each user.

Figure 15:
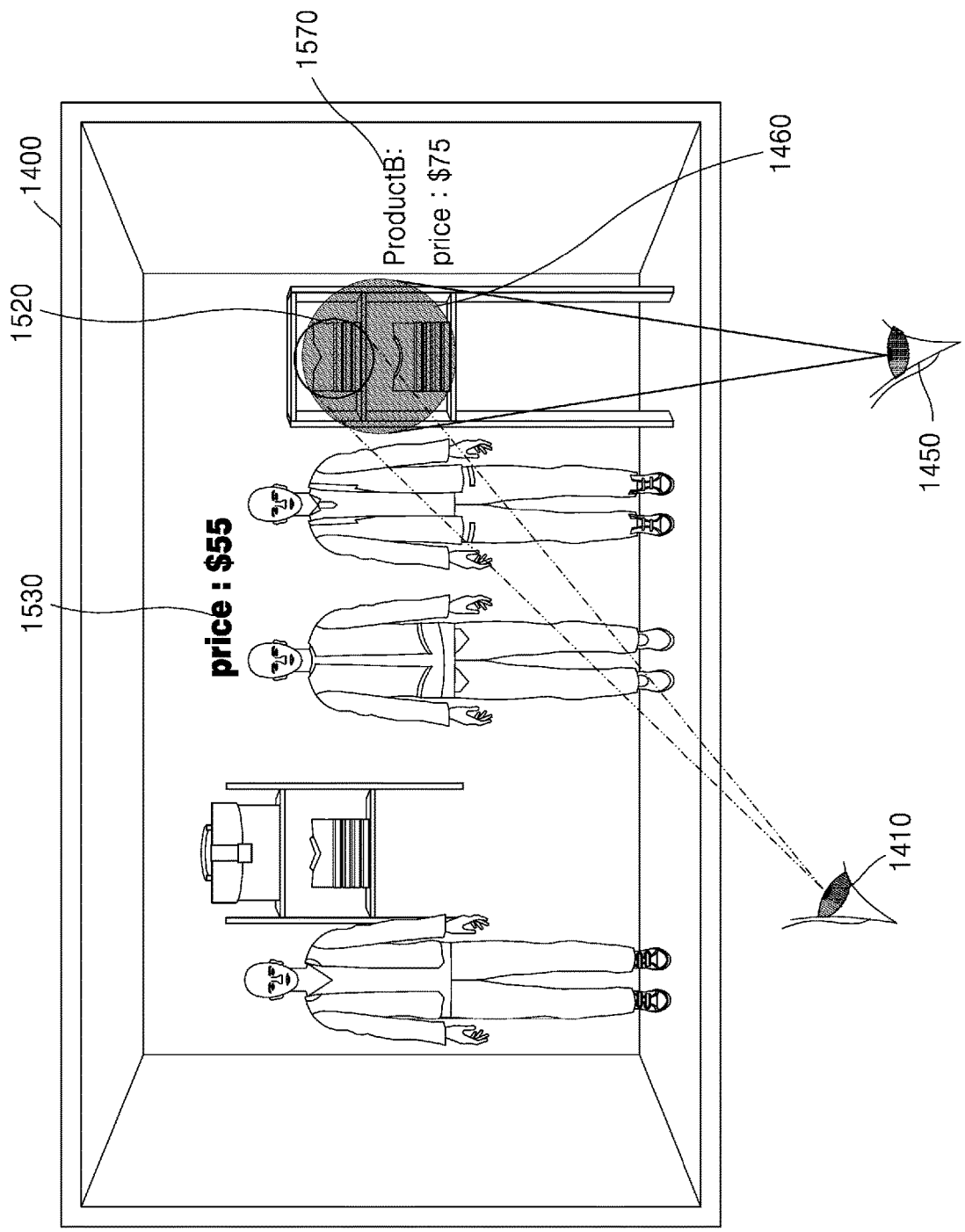
FIG. 15 is a diagram illustrating an operation of analyzing background objects that a plurality of users are looking at, according to directions of eye gazes of a plurality of users, and displaying information related to background objects according to an embodiment of the disclosure.

FIG. 15 is a diagram illustrating an operation of analyzing background objects that a plurality of users are looking at, according to the directions of eye gazes of the plurality of users, and displaying information related to the background objects according to an embodiment of the disclosure.

Referring to FIGS. 14 and 15, in FIG. 14 illustrating a situation subsequent to that in FIG. 15, the sensor 120 may detect that the point of eye gaze of the first user 1410 who was looking at the first exhibited product 1420 has moved to the second exhibited product 1460. More particularly, the sensor 120 may detect that the first user 1410 is looking at an upper exhibited product 1520 of the second exhibited product 1460. The processor 140 may determine that the upper exhibited product 1520 is the same product as the first exhibited product 1420, and display, on the screen 1400, information 1530 related to the upper exhibited product 1520, considering the movement of the point of eye gaze of the first user 1410 to the upper exhibited product 1520. In addition, because the second user 1450 is also looking at the second exhibited product 1460 including the upper exhibited product 1520, the processor 140 may control the screen 1400 to display, on a position that the eye gaze of the second user 1450 may reach, the information 1530 related to the upper exhibited product 1520. In addition, the processor 140 may control the screen 1400 to display only information 1570 related to a lower exhibited product, by excluding the information 1530 related to the upper exhibited product 1520 from the information 1470 related to the second exhibited product 1460 displayed at the position that the eye gaze of the second user 1450 reaches as illustrated in FIG. 14.

Accordingly, when the sensor 120 detects that a plurality of users are looking at the same exhibited product, the processor 140 may control the transparent screen 110 to display, on positions viewable by the plurality of users, information related to the exhibited product.

Hereinafter, FIGS. 16 to 18 are diagrams illustrating, in top-down views and front views, a situation in which a user is looking at an exhibited product beyond a screen.

FIG. 16 illustrates, in a top-down view and a front view, a situation in which related information is displayed on a transparent screen according to a transparent screen, a user, and a background object according to an embodiment of the disclosure.

Referring to FIG. 16, it illustrates a situation in which a user at a first position 1610 standing in front of a transparent screen 1600 is looking at an exhibited product 1620 in a shop beyond the transparent screen 1600.

When the sensor 120 detects that the user is moving and looking at the transparent screen 1600, the processor 140 may analyze the direction of an eye gaze 1640 of the user, the movement speed of the user, and the direction of the user's head.

In addition, the processor 140 may detect an exhibited product in the shop recognizable with the eye gaze 1640 from the user's point of view by using the sensor 120, and retrieve information related to the detected exhibited product from a database.

The processor 140 may display, on the transparent screen 1600, retrieved related information 1630. Here, the related information 1630 displayed on the screen may include the price of the exhibited product, visual data of a product of the same model as the exhibited product but of a different color, and the like.

FIG. 17 is a diagram illustrating a situation in which a user of FIG. 16 is moving and looking at part of related information according to an embodiment of the disclosure.

Referring to FIG. 17, it illustrates a situation in which an eye gaze moves as the user moves from the first position 1610 to a second position 1710.

When the sensor 120 detects the movement of the user and the movement of the eye gaze, the processor 140 may analyze the current direction of an eye gaze 1740 and determine that the user is looking at certain information 1630 among the related information 1630. In addition, when the user is moving and looking at the related information 1630 and a certain product object 1730 at the second position 1720, the processor 140 may adjust the positions and sizes of the related information 1630 and a product object 1730 not to overlap the exhibited product 1620 according to the eye gaze 1740.

In addition, the processor 140 already has information about the movement speed of the user, and thus may determine an expected position of the user after a certain time period according to the movement speed. Accordingly, the positions and sizes of the related information 1630 and the product object 1730 may be adjusted in advance according to the expected position of the user over time.

FIG. 18 is a diagram illustrating an operation of displaying, on a transparent screen, detailed information of information that a user is looking at in FIG. 17, considering a movement speed of the user according to an embodiment of the disclosure.

Referring to FIG. 18, when the sensor 120 detects that the user moves from the second position 1710 to a third position 1810, the processor 140 may detail the content of the related information displayed on the transparent screen 1600. For example, related information 1830 including a detailed product description about the product object 1730 may be displayed on the transparent screen 1600. In addition, in this case, when the user is looking at the related information 1830 at the user's position while moving to the third position 1810, the processor 140 may adjust the position and size of the related information 1830 not to overlap the exhibited product 1620 according to an eye gaze 1840.

Therefore, the processor 140 may predict an expected position of the user according to the movement of the user and track the eye gaze of the user. Accordingly, the processor 140 may identify a background object or screen display information to which the eye gaze of the user is directed. The processor 140 may change the content and a UI object of screen-displayed information according to the object to which the eye gaze is directed. In addition, the processor 140 may change the position, size, and UI object of the screen-displayed information not to overlap other background objects and other screen-displayed information, according to the direction of the eye gaze.

Various embodiments of the display device 100 described above with reference to FIGS. 1 to 18 may be applied to various types of display devices having a transparent screen. For example, objects may be viewed through a transparent screen attached to a transparent panel device, such as a large format display (LFD), an electronic display board, a windshield of a vehicle, or a head-mounted display (HMD). For example, various embodiments of the display device 100 may be applied to a glass window of a public transport vehicle to provide various pieces of information to a user looking at the glass window.

In addition, the display device 100 may be applied to smart glasses. In this case, the display device 100 may perform measurement to determine whether an eye gaze of a user is directed toward an object displayed on a transparent display screen of the smart glasses or a real object outside the smart glasses. Because the distance between the smart glasses and the user is fixed, the display device 100 does not need to track the user's position. The display device 100 may track all moving objects outside the smart glasses in real time and classify them by properties.

Figure 19:
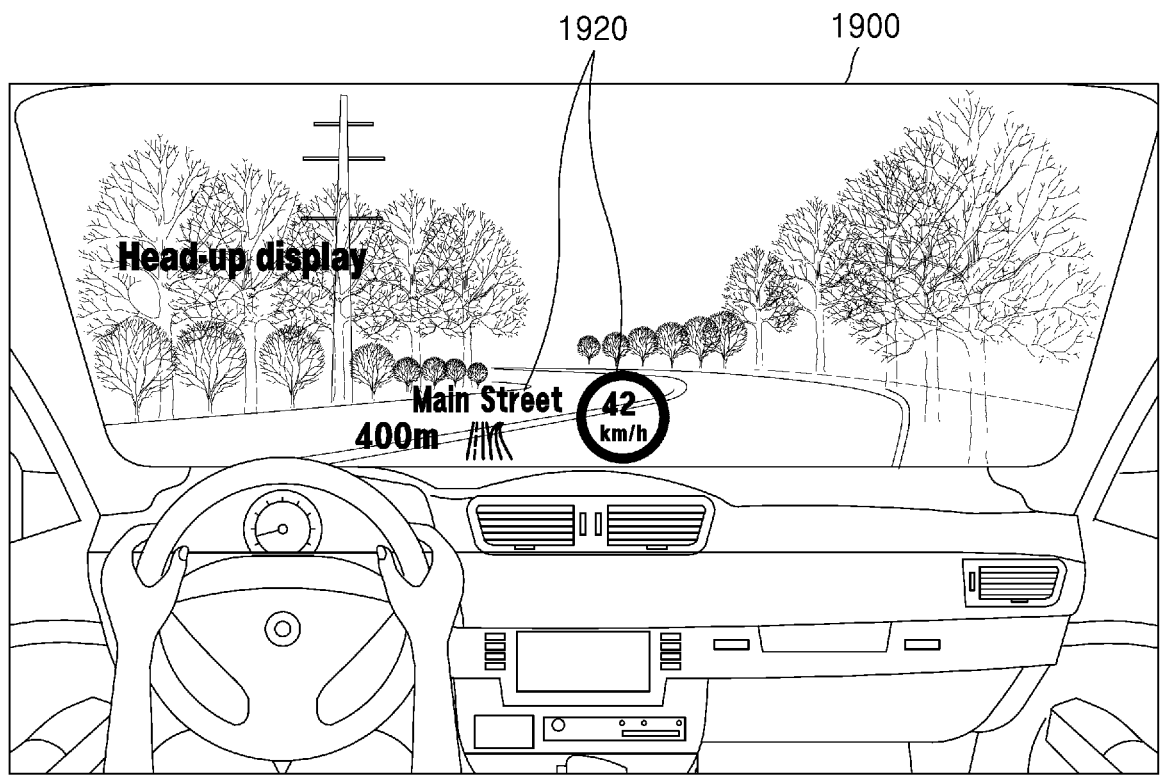
FIG. 19 is a diagram illustrating an operation, performed by a display device, of controlling a transparent screen of a head-up display of a vehicle according to an embodiment of the disclosure.

FIG. 19 is a diagram illustrating an operation, performed by a display device, of controlling a transparent screen of a head-up display of a vehicle according to an embodiment of the disclosure.

Referring to FIG. 19, the display device 100 may be applied to a glass window 1900 of a vehicle, such as a windshield of a vehicle. The display device 100 may determine an object to which an eye gaze of a user is directed, from among objects on a road. The display device 100 may control the glass window 1900 to display information 1920 about a target object on the road.

The display device 100 may determine whether the user is looking at information displayed on the glass window 1900. When it is detected that the user is looking at the information displayed on the glass window 1900 for a certain time period or longer, the display device 100 may take action to direct the eye gaze of the user toward the road. For example, the display device 100 may reduce the number of pieces of information displayed on the glass window 1900, change the position of the information being displayed, or display warning information. The display device 100 may control an audio system of the vehicle to sound an alarm.

The display device 100 may control the glass window 1900 not to display related information in the direction of the gaze from the user's position toward an important object on the road. Accordingly, the display device 100 may control the glass window 1900 to display related information in a gaze direction toward an empty road or an air space.

Some embodiments may be implemented as a recording medium including computer-executable instructions, such as a computer-executable program module. At least one non-transitory computer-readable medium may be any available medium which is accessible by a computer, and may include a volatile or non-volatile medium and a removable or non-removable medium. In addition, the at least one non-transitory computer-readable media may include computer storage media. The computer storage media include both volatile and non-volatile, removable and non-removable media implemented in any method or technique for storing information, such as computer readable instructions, data structures, program modules or other data.

The embodiments of the disclosure may be implemented as a software (S/W) program including instructions stored in at least one non-transitory computer-readable storage medium.

The computer may invoke stored instructions from the storage medium and operate according to an embodiment of the disclosure based on the invoked instructions, and may include an electronic device according to the embodiments of the disclosure.

The at least one non-transitory computer-readable storage medium may be provided in the form of a non-transitory storage medium. Here, the term 'non-transitory' simply means that the storage medium is a tangible device, and does not include a signal, but this term does not differentiate between where data is semi-permanently stored in the storage medium and where the data is temporarily stored in the storage medium.

In addition, a control method according to the embodiments of the disclosure may be provided in a computer program product. The computer program product may be traded between a seller and a purchaser as a commodity.

The computer program product may include a S/W program and at least one non-transitory computer-readable recording medium storing the S/W program. For example, the computer program product may include a product in the form of a software program electronically distributed (e.g., a downloadable application) through a manufacturer of a device or an electronic market (e.g., Google Play Store, App Store). For electronic distribution, at least part of the S/W program may be stored in a storage medium or temporarily generated. In this case, the storage medium may be a storage medium of a server of the manufacturer or a server of the electronic market, or a relay server that temporarily stores the S/W program.

The computer program product may include a storage medium of a server or a storage medium of a device, in a system consisting of the server and the device. Alternatively, when there is a third device (e.g., a smart phone) communicatively connected to the server or the device, the computer program product may include a storage medium of the third device. Alternatively, the computer program product may include the S/W program itself, which is transmitted from the server to the device or the third device or transmitted from the third device to the device.

In this case, one of the server, the device, and the third device may execute the computer program product to perform the method according to the embodiments of the disclosure. Alternatively, two or more of the server, the device, and the third device may execute the computer program product to execute the method according to the embodiments of the disclosure in a distributed manner.

For example, the server (e.g., a cloud server, an artificial intelligence server) may execute the computer program product stored in the server to control the device communicatively connected to the server to perform the method according to the embodiments of the disclosure.

In another example, the third device may execute the computer program product to control the device communicatively connected to the third device to perform the method according to the embodiments of the disclosure. When the third device executes the computer program product, the third device may download the computer program product from the server, and execute the downloaded computer program product. Alternatively, the third device may execute the computer program product provided in a preloaded state, and perform the method according to the embodiments of the disclosure.

In addition, the terms described in the specification, such as " . . . er (or)", " . . . unit", " . . . module", or the like, denote a unit that performs at least one function or operation, which may be implemented as hardware or software or a combination thereof.

The above-described description of the disclosure is provided only for illustrative purposes, and those of skill in the art will understand that the disclosure may be easily modified into other detailed configurations without modifying technical aspects and essential features of the disclosure. Therefore, it should be understood that the above-described embodiments of the disclosure are in all respects and are not limited. For example, the components described as single entities may be distributed in implementation, and similarly, the components described as distributed may be combined in implementation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of controlling a display device including a transparent screen, the method comprising:
   recognizing a position of a user in front of the transparent screen and an eye gaze of the user looking at the transparent screen;
   recognizing a position of a background object behind the transparent screen;
   detecting a change from a first eye gaze with which the user looks at a first point, to a second eye gaze with which the user looks at a second point;
   determining, as a minimum angular change of an eye gaze, a minimum angle by which the change between the first eye gaze and the second eye gaze is detected;
   displaying, on the transparent screen, information related to the background object, when the background object is at a position within the minimum angular change of the eye gaze from a current eye gaze of the user; and
   when the user moves, predicting the eye gaze changing according to a movement speed of the user, and moving the related information such that the related information is displayed at a position on the transparent screen out of the minimum angular change of the eye gaze from the current eye gaze of the user,
   wherein, a probability distribution of the first point and a first entire area is determined,
   wherein the first point is a point that the user at a current distance from the transparent screen is most likely looking at, and the first entire area an area that the user is likely looking at, and
   wherein the second point and a second entire area are determined according to the probability distribution, the second point is a point that the user is most likely looking at after a preset time period T, and the second entire area is an area that the user is likely looking at after the preset time period T.

2. The method of claim 1, wherein the recognizing of the position of the background object behind the transparent screen includes:
  classifying background objects behind the transparent screen into stationary objects and moving objects;
  classifying the background objects by color, color pattern, and angular diameter; and
  determining whether the background objects are stored in a database.

3. The method of claim 1,
  wherein the recognizing of the position of the user in front of the transparent screen and the eye gaze of the user looking at the transparent screen includes detecting the position of the user, the movement speed and a moving direction of the user, the current distance between the transparent screen and the user, and a head position of the user, and
  wherein, when the user moves, the predicting of the eye gaze according to the movement speed of the user includes predicting the position of the user and the head position of the user after a certain time period according to the movement speed of the user.

4. The method of claim 1,
  wherein the recognizing of the position of the background object behind the transparent screen includes detecting, when there is no information displayed in an area on the transparent screen that the user is looking at, the background object behind the transparent screen, and
  wherein the displaying, on the transparent screen, of the information related to the background object includes displaying, when the background object is identified, the information related to the background object, at a position, on the transparent screen that does not obscure the background object.

5. The method of claim 4, wherein the displaying of the information related to the background object at the position on the transparent screen that does not obscure the background object includes determining a position at which the related information is displayed, such that a distance between a position of the background object appearing on the transparent screen and the related information displayed on the transparent screen is greater than the minimum angular change of the eye gaze.

6. The method of claim 5, wherein the displaying, on the transparent screen, of the information related to the background object includes detecting that a point of the eye gaze moves from the background object to the related information.

7. The method of claim 1, wherein the displaying, on the transparent screen, of the information related to the background object includes changing the related information displayed on the transparent screen, according to a situation at a current position of the user, after a certain time period has elapsed from a current time point.

8. The method of claim 1, wherein the displaying, on the transparent screen, of the information related to the background object includes, when it is detected that, after the related information is displayed, a point of the eye gaze moves to the background object behind the transparent screen without moving to the related information and is fixed for a certain time period or longer, reducing a number of items that the related information is displayed on the transparent screen.

9. The method of claim 1, wherein the displaying, on the transparent screen, of the information related to the background object includes, when it is detected that a point of the eye gaze moves from the background object behind the transparent screen to the related information displayed on the transparent screen, alternately displaying various pieces of related information corresponding to various properties of the background object.

10. The method of claim 1,
  wherein the displaying, on the transparent screen, of the information related to the background object includes:
    when it is detected that, after the related information is displayed, a point of the eye gaze moves to the related information, moving back to the background object, and moves back to the related information, analyzing a field of interest of the user, and
    displaying information related to the background object according to the field of interest of the user, and
  wherein the field of interest of the user includes components of the background object and content of the related information.

11. At least one non-transitory computer-readable recording medium having recorded thereon a program code for executing the method of claim 1, on a computer.

12. A display device comprising:
  a transparent screen;
  a sensor configured to recognize an object in front of the transparent screen and an object behind the transparent screen; and
  at least one processor configured to:
    receive a position of a user in front of the transparent screen and an eye gaze of the user looking at the transparent screen, which are recognized by using the sensor,
    receive a position of a background object behind the transparent screen, which is recognized by using the sensor,
    detect a change from a first eye gaze with which the user looks at a first point, to a second eye gaze with which the user looks at a second point,
    determine, as a minimum angular change of an eye gaze, a minimum angle by which the change between the first eye gaze and the second eye gaze is detected,
    and
    display, on the transparent screen, information related to the background object when the background object is at a position within the minimum angular change of the eye gaze from a current eye gaze of the user,
  wherein the at least one processor is further configured to:
    when the user moves, predict the eye gaze changing according to a movement speed of the user, and
    move the related information such that the related information is displayed at a position on the transparent screen out of the minimum angular change of the eye gaze from the current eye gaze of the user,
  wherein, a probability distribution of the first point and a first entire area is determined,
  wherein the first point is a point that the user at a current distance from the transparent screen is most likely looking at, and the first entire area is an area that the user is likely looking at, and
  wherein the second point and a second entire area are determined according to the probability distribution, the second point is a point that the user is most likely looking at after a preset time period T, and the second entire area is an area that the user is likely looking at after the preset time period T.

* * * * *